United States Patent [19]
Aoki

[11] Patent Number: 6,023,535
[45] Date of Patent: *Feb. 8, 2000

[54] METHODS AND SYSTEMS FOR REPRODUCING A HIGH RESOLUTION IMAGE FROM SAMPLE DATA

[75] Inventor: Shin Aoki, Yokohama, Japan

[73] Assignee: Ricoh Company, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/705,233

[22] Filed: Aug. 30, 1996

[30] Foreign Application Priority Data

Aug. 31, 1995 [JP] Japan ................................ 7-222891
Sep. 6, 1995 [JP] Japan ................................ 7-229507

[51] Int. Cl.[7] ................. G06K 9/40; G06K 9/32; G06K 9/54
[52] U.S. Cl. ................. 382/299; 382/264; 382/268; 382/269; 382/302
[58] Field of Search ........................ 382/240, 268, 382/269, 299, 302, 304, 264

[56] References Cited

U.S. PATENT DOCUMENTS

| | | | |
|---|---|---|---|
| 5,068,905 | 11/1991 | Hackett et al. | 382/299 |
| 5,202,936 | 4/1993 | Kobiyama | 382/299 |
| 5,258,854 | 11/1993 | Eschbach | 382/299 |
| 5,696,848 | 12/1997 | Patti et al. | 382/300 |

OTHER PUBLICATIONS

Shigeru Ando, A Velocity Vector Field Measurement System Based on Spatio–Temporal Image Derivative (1986) Non-–English.

*Primary Examiner*—Phuoc Tran
*Assistant Examiner*—Daniel G. Mariam
*Attorney, Agent, or Firm*—Knoble & Yoshida LLC

[57] ABSTRACT

The current invention discloses methods of and systems for reproducing an original two dimensional image from data sampled at a low resolution. The data is sampled at the same frequency but at parallel displacement positions. The current invention discloses methods of and systems for substantially eliminating fold-over alias noises from the sampled data so that a high-resolution image is reproduced.

33 Claims, 18 Drawing Sheets

METHODS AND SYSTEMS FOR REPRODUCING A HIGH RESOLUTION IMAGE FROM SAMPLE DATA

FIELD OF THE INVENTION

The current invention is generally related to methods of and systems for reproducing a two dimensional image from sampled data, and more particularly related to methods of and systems for substantially eliminating fold-over alias noises from the sampled data so that a high-resolution image is reproduced.

BACKGROUND OF THE INVENTION

With the recent increased use of image/visual information, high-resolution images are desired at reasonable costs. In the context of the current application, the high-resolution image process is related to sampling or scanning an original image into two-dimensional digitized image data and reproducing the original image based upon the sampled image data. The original image is reproduced on an image-carrying medium such as paper as well as on a display monitor. Because the above described image reproduction process is routinely preformed by personal computers with printers, digital copiers, facsimile machines and digital cameras, the improved resolution at a reasonable cost is commercially significant.

In order to reproduce high resolution images, one way is to digitize the original images by high-resolution input devices so that high resolution image data is generated. Input devices such as digital cameras require high resolution charge-coupled devices (CCD) for high-resolution images, and the high-resolution CCD's are generally expensive. At the time of the current invention, since a CCD of 1,000,000 pixels is substantially more expensive than a CCD of 400,000 pixels, an alternative way that does not require an expensive component is desired.

One type of attempts includes the signal processing of sampled data such as described in "Super-Resolved Surface Reconstruction From Multiple Images," by Cheeseman et al., pp. 0–12, Technical Report FIA-93-02, NASA AMS Research Center (1993). According to this approach, an original signal or image is reproduced from a plurality of sampled images such as satellite pictures based upon the Bayesian probability theory using a likelihood function which defines the probability of the observed data given a parameterized model for the data generation. In other words, the likelihood of the entire image is assumed to be just the product of likelihoods of each pixel. Each sampled data set thus includes the original signal and the aliasing noise both of which depend upon a set of sampling conditions or parameters. For this reason, it is difficult to isolate the original signal from the aliasing noise.

In the field of digital processing or computer graphics, it is known that if an original image is band limited below a half of the highest sampling frequency which is defined as a Nyquist frequency, and it is possible to reproduce an original image from the sampled signals. In other words, a signal can be properly reconstructed from its sampled data if the original signal is sampled at a frequency that is greater than twice the highest frequency component in its spectrum. In addition, it is also known that based upon multiple data sets that are sampled at displacement positions, an original image is reproduced. However, the displacement positions are precisely determined in advance and require an additional precision placement device. These restrictions are undesirable for reproducing an original image based upon the low resolution data sets using a low cost sampling device.

SUMMARY OF THE INVENTION

To solve the above and other problems, according to one aspect of the current invention, a method of reproducing a high-resolution original image from a plurality of low-resolution image data sets, includes the steps of: a) sampling an original image at a predetermined sampling frequency for a predetermined number of times so as to compile a predetermined number of the low-resolution image data sets, each of the sampled image data sets representing the original image at parallel displacement positions; b) substantially eliminating fold-over aliasing noises caused by sampling the low-resolution image data sets during the step a); and c) reproducing the original image at least at an original resolution from the low-resolution image data sets after the step b).

According to a second aspect of the current invention, a method of reproducing a high-resolution original image from a plurality of low-resolution image data sets, includes the steps of: a) sampling an original image at a predetermined sampling frequency for a predetermined number of times so as to compile a predetermined number of the low-resolution image data sets, each of the sampled image data sets representing the original image at rotated positions; b) dividing each of the sampled image data sets into a predetermined number of blocks; c) for each of the blocks, substantially eliminating fold-over aliasing noises caused by sampling the low-resolution image data sets during the step a); and d) reproducing the original image at least at an original resolution from the low-resolution image data sets after the step c).

According to a third aspect of the current invention, a system for reproducing a high-resolution original image from a plurality of low-resolution image data sets, includes: a sampling unit for sampling an original image at a predetermined sampling frequency for a predetermined number of times so as to compile a predetermined number of the low-resolution image data sets, each of the sampled image data sets representing the original image at parallel displacement positions; a low pass filter connected to the sampling unit for filtering out a certain portion of the sampled data; a processing unit connected to the low pass filter for substantially eliminating fold-over aliasing noises caused in the sampled image data sets by the sampling unit, the fold-over aliasing noises being mutually canceled by placing weights on the fold-over aliasing noises according to the parallel displacement positions; and a reproduction unit connected to the processing unit for reproducing the original image at least at an original resolution from the low-resolution image data sets.

According to a fourth aspect of the current invention, a system for reproducing a high-resolution original image from a plurality of low-resolution image data sets, includes: a sampling unit sampling an original image at a predetermined sampling frequency for a predetermined number of times so as to compile a predetermined number of the low-resolution image data sets, each of the sampled image data sets representing the original image at rotated positions; a processing unit connected to the sampling unit for dividing each of the sampled image data sets into a predetermined number of blocks, for each of the blocks, the processing unit substantially eliminating fold-over aliasing noises in the low-resolution image data sets; and a reproduction unit connected to the processing unit for reproducing the original image at least at an original resolution from the low-resolution image data sets.

According to a fifth aspect of the current invention, a computer program product for reproducing a high-resolution original image, includes: a computer usable medium having computer readable program code embodied in the medium for causing a computer to generate signals indicative of a high resolution image based upon low resolution image data sets, the computer program product having: computer readable sample program code for causing the computer to control a sampling device which samples image information from an original image at parallel displacement positions and for causing the computer to store the sampled image information in a digitized form; and computer readable processing program code for causing the computer to process the sampled image information to substantially eliminate fold-over aliasing noises included in the sampled image information.

According to a sixth aspect of the current invention, An article of manufacture, includes: a computer usable storage medium for storing a computer readable program code embodied therein which provides computer instructions for increasing a resolution level of an image represented by a plurality of data sets, the computer readable program code in the article of manufacture comprising: computer readable sample program code for causing the computer to control a sampling device which samples image information from an original image at parallel displacement positions so as to compile the plurality of the data sets and for causing the computer to store the sampled data sets in a digitized form; and computer readable processing program code for causing the computer to process the sampled data sets containing fold-over aliasing noises so as to substantially eliminate the fold-over aliasing noises by determining weight values which cancels terms including the fold-over aliasing noises when the terms are summed.

According to a seventh aspect of the current invention, a program storage device readable by a machine, tangibly embodying a program of instructions executable by the machine to perform method steps of reproducing a high-resolution image, the method steps includes: a) sampling an original image at a predetermined sampling frequency for a predetermined number of times so as to compile a predetermined number of the low-resolution image data sets, each of the sampled image data sets representing the original image at parallel displacement positions; b) substantially eliminating fold-over aliasing noises caused by sampling the low-resolution image data sets during the step a); and c) reproducing the original image at least at an original resolution from the low-resolution image data sets after the step b).

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
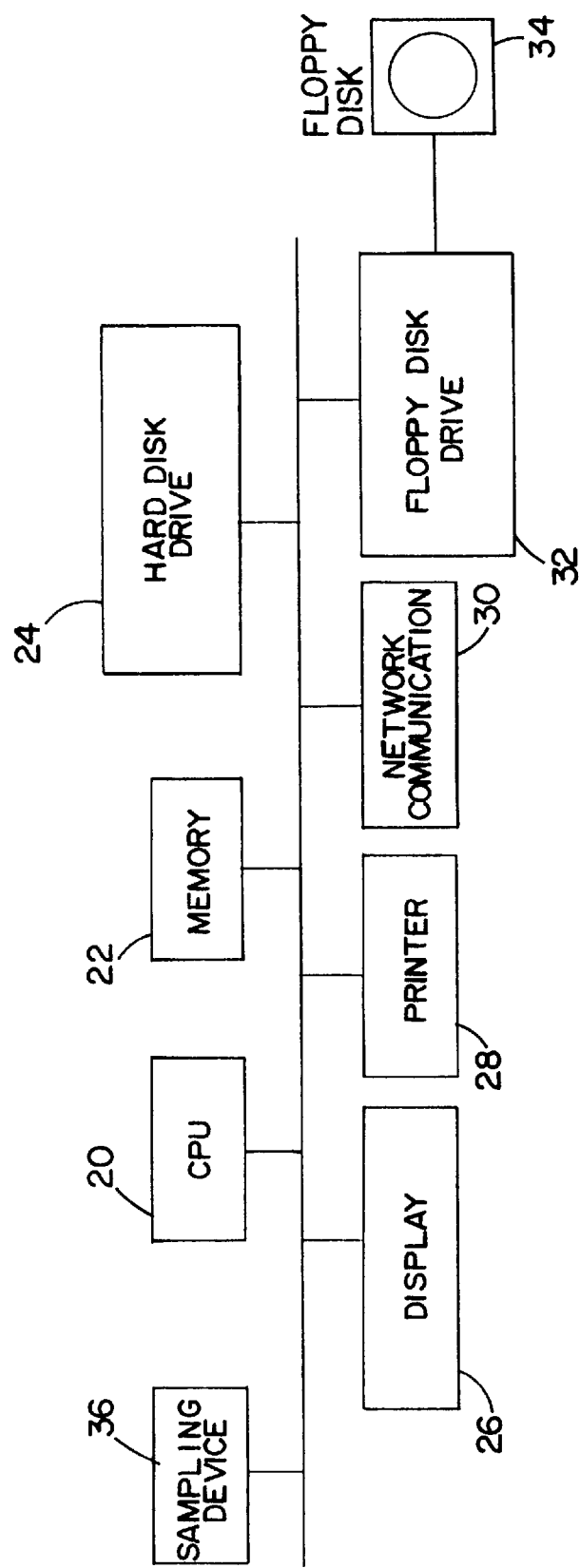
FIG. 1 is a block diagram illustrating one example of environment where the current invention is practiced.

Referring now to the drawings, wherein like reference numerals designate corresponding structure throughout the views, and referring in particular to FIG. 1, the general environment for the current invention includes software, hardware and a combination of both. The methods of and system for the current invention are practiced with an apparatus including at least a CPU 20, a memory 22 and an output device. In this environment, sampled data exists in a storage device such as a RAM memory 22, a floppy disk 34 with access via a floppy disk driver 32, a hard disk device 24 or a network storage device with access via a network communication device 30 for the processes according to the current invention. However, a sampling device 36 such as a scanner is optionally combined to the environment for generating an input sampled data. The processed high-resolution image data is also optionally outputted to output devices such as a display unit 26 and a printer 26 or to the storage devices such as one in a network communication 30, the floppy disk 34 via the floppy disk driver 32 and the hard disk 24. In addtion to the above described application environment, the current inventive concept of improving resolution is applicable to digital copiers and digital cameras.

Figure 2:
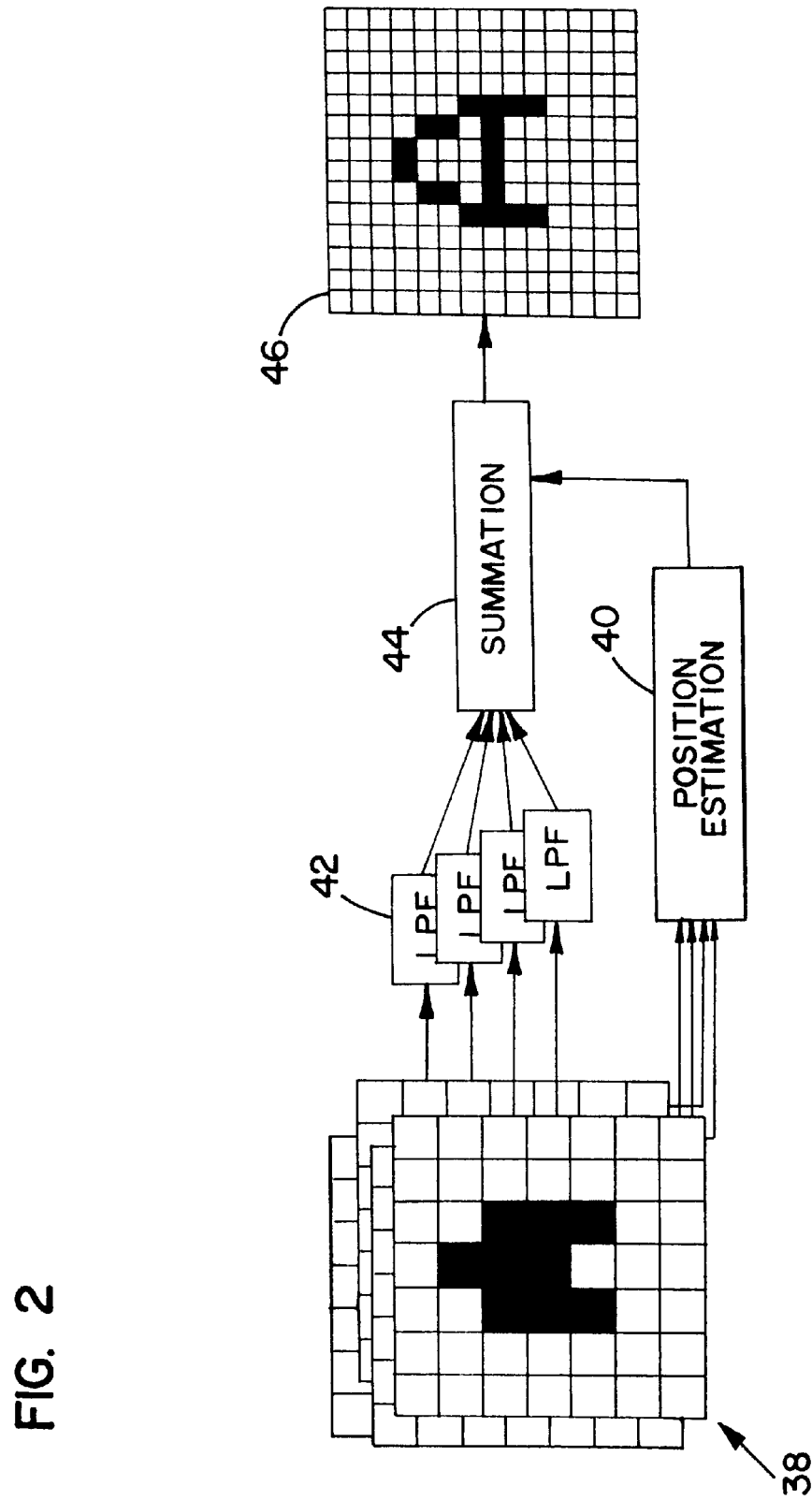
FIG. 2 is a block diagram illustrating a process of reproducing a high-resolution image based upon low-resolution sampled data sets.

Referring to FIG. 2, an inventive concept of the current invention is illustrated in a diagram. An original image such as a letter "A" is sampled for a predetermined number of times to compile low-resolution image data sets 38. The original image is sampled at a predetermined constant or uniform frequency, but each of these data sets is sampled at a slightly shifted position or at a parallel displacement position. In other words, either the original image is moved or the sampling starting position is shifted for each of the data sets. The unsorted side edges of the sampled data sets 38 indicate different parallel displacement positions. The data sets 38 also indicate that since the original letter "A" has been sampled at a low resolution, the letter appears blurred and does not clearly retain the original visual characteristics. As will be more fully described, the low-resolution sampling processes cause the sampled data sets to contain undesirable noises such as fold-over aliasing noise or fold-over harmonics As described above, the sampled image data sets are compiled as the original image is placed at parallel displacement positions. According to one preferred embodiment of the current invention, these parallel displaced positions are known or predetermined. The absolute X and Y coordinates or a relative distance from an initially sampled image is used during the resolution converting process. To place the original image at the precisely known displacement positions, a sampling unit must be equipped with a precision placement mechanism. On the other hand, according to another preferred embodiment as shown in FIG. 2, the parallel displacement positions are not known at the time of sampling, and these displacement positions are optionally estimated by a displacement position estimation unit 40 which will be later described in details. With the second preferred embodiment, the original image positioning mechanism does not need to be precise. In fact, the displacement positions may be obtained by casually placing the original at various positions on a scanner. The position estimation unit 40 is also useful for certain practical applications such as accidental movements of a digital camera during the image capturing process.

Still referring to FIG. 2, the low-frequency sampled data are now processed according to the current invention to reproduce the original image at least at the original resolution. The sampled data sets are first filtered through a low-pass filter 42 (LPF). As described in the background section, the current invention is not limited to an original data below the Nyquist frequency and is applicable to the original data in a wide frequency range. However, in order to filter out certain undesirable frequency noise, the sampled data sets are filtered by the LPF 42, which has a wide frequency band. The details of the LPF 42 will be also later described.

Still referring to FIG. 2, the filtered data from the separate samples is now summed together by a summation unit 44 while each data set is multiplied by a certain weight value. The weight values are determined in such a manner that the above described aliasing noises are canceled with each other to leave only a signal representing the original image at the original resolution. As the result of the above described summation, the summation unit 44 generates a reproduced image 46 at a resolution level higher than that of the sampled data 38. FIG. 2 illustrates this improved resolution by indicating smaller grids in the reproduced image 46 as well as clearly indicating the original letter image "A."

The general inventive concept as described with respect to FIG. 2 will now be more fully described with respect to FIGS. 3–22. The following descriptions and illustrations of preferred embodiments are only exemplary, and the above described current inventive concept is not limited by these preferred embodiments.

Figure 3:
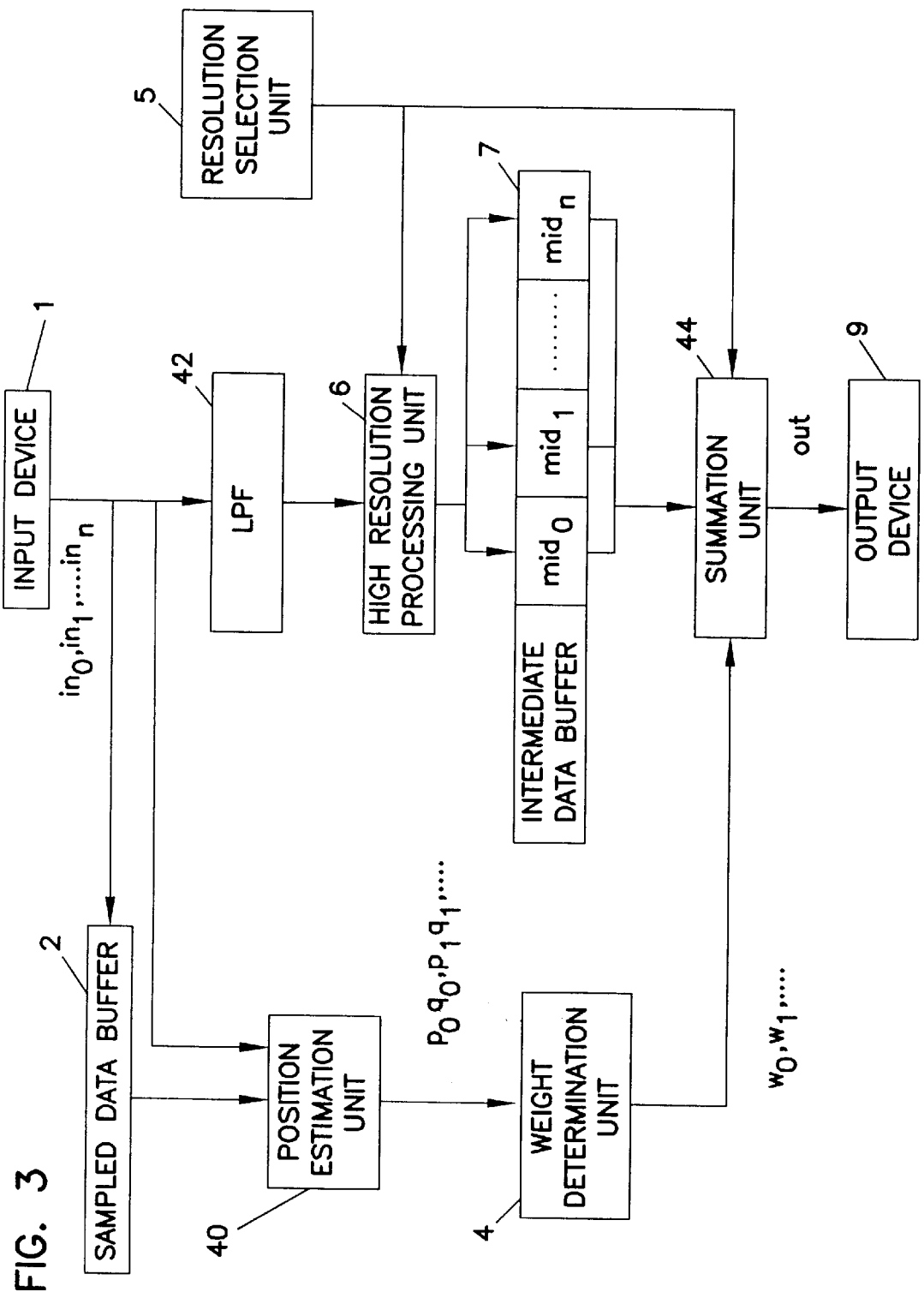
FIG. 3 is a block diagram illustrating one preferred embodiment of the system for reproducing a high-resolution image based upon low-resolution sampled data sets according to the current invention.

Referring to FIG. 3, one preferred embodiment for the resolution improving system according to the current invention is illustrated in a block diagram. The above described sampled data is generated by an input device 1, and the sampled input data sets are designated by $in_0, in_1, \ldots in_n$. The data sets $in_0, in_1, \ldots in_n$ have been sampled at unknown parallel displacement positions. For this reason, this preferred embodiment includes a position estimation unit 40 to determine a relative displacement distance between a given data set $in_i$ (i ranges from 1 to n) and the initial data set $in_0$. To determine the relative displacement amount, the initial sampled data set $in_0$ is stored in a sampled data buffer 2 for later comparisons. The position estimation unit 40 determines the relative displacement positions $p_0q_0, p_1q_1, \ldots p_nq_n$ for the corresponding sampled data sets $in_0, in_1, \ldots in_n$ based upon a predetermined process.

The above estimated displaced positions are inputted into a weight value determination unit 4 for determining desirable weight values $w_0, w_1, \ldots w_n$ for the corresponding sample data sets. In general, the weight values are used to adjust the sampled data sets so that the fold-over aliasing noises in the sampled data sets are substantially canceled with each other when the weighted sample data sets are summed together. To determine the desirable weight values, according to one preferred embodiment, the sum of all of the weight values themselves should be one while the sum of a product of a weight value and the corresponding term involving a fold-over aliasing noise should be zero. The term having one leaves the original signal intact. However, the summed weight values do not have to be zero to substantially minimize the fold-over aliasing noises. According to a second preferred embodiment, the sum of the squared weight values should be minimal. Yet according to a third preferred embodiment, the sum of the squared weight values and the square of the sum of a product of a weight value and the corresponding term involving a fold-over aliasing noise should be minimal.

Still referring to FIG. 3, the sampled data sets $in_0, in_1, \ldots in_n$ are first filtered by a low pass filter (LPF) 42, and the its output is then process by a high-resolution processing unit 6. In general, an ideal LPF in a frequency space is summarized as LPF(u,v), which returns the Nyquist frequency×2 if u is higher than a negative value of the Nyquist frequency×2 and at the same time v is lower than a positive value of the Nyquist frequency×2. Otherwise, LPF (u,v) returns 0. On the other hand, another ideal filter in the special frequency includes sinc2(x,y)=sinc(x/2, y/2). The LPF 42 is generally designed to filter through a wide frequency of sampled signals including an entire spectrum of the basic frequency and some partial spectrum of harmonics frequencies or fold-over aliasing noises.

According to one preferred embodiment of the current invention, the filtered output signals are now processed by a high-resolution processing unit 6. Assuming that the sampling device has a lower resolution than that of the originally inputted image, in order to output at least at the original resolution or a higher resolution than the original, the filtered sampled data sets are processed according to a resolution factor. The resolution factor may be predetermined or user-selected on the fly. A resolution selection unit 5 has the above described resolution factor information. For example, if the resolution is to be increased by four times that of the sampled data, the number of sampled data should be increased four times while the sampling frequency should be decreased to ¼. According to one preferred embodiment of the current invention, because the original image is to be reproduced including the frequency signals up to twice the Nyquist frequency, the resolution factor should be larger than 2 in order to avoid undesirable effects of the fold-over aliasing noises. The high-resolution data is now temporarily stored in an intermediate data buffer 7 as $mid_0, mid_1, \ldots mid_n$.

Finally, still referring to FIG. 3, after the desirable weight values $w_0, w_1, \ldots w_n$ have been determined, the product of a weight value and the corresponding the high-resolution data sets $mid_0, mid_1, \ldots mid_n$ is summed in the summation unit 44. The summed products or the high-resolution processed data out is outputted to a output device such as a printer and a display.

Figure 4:
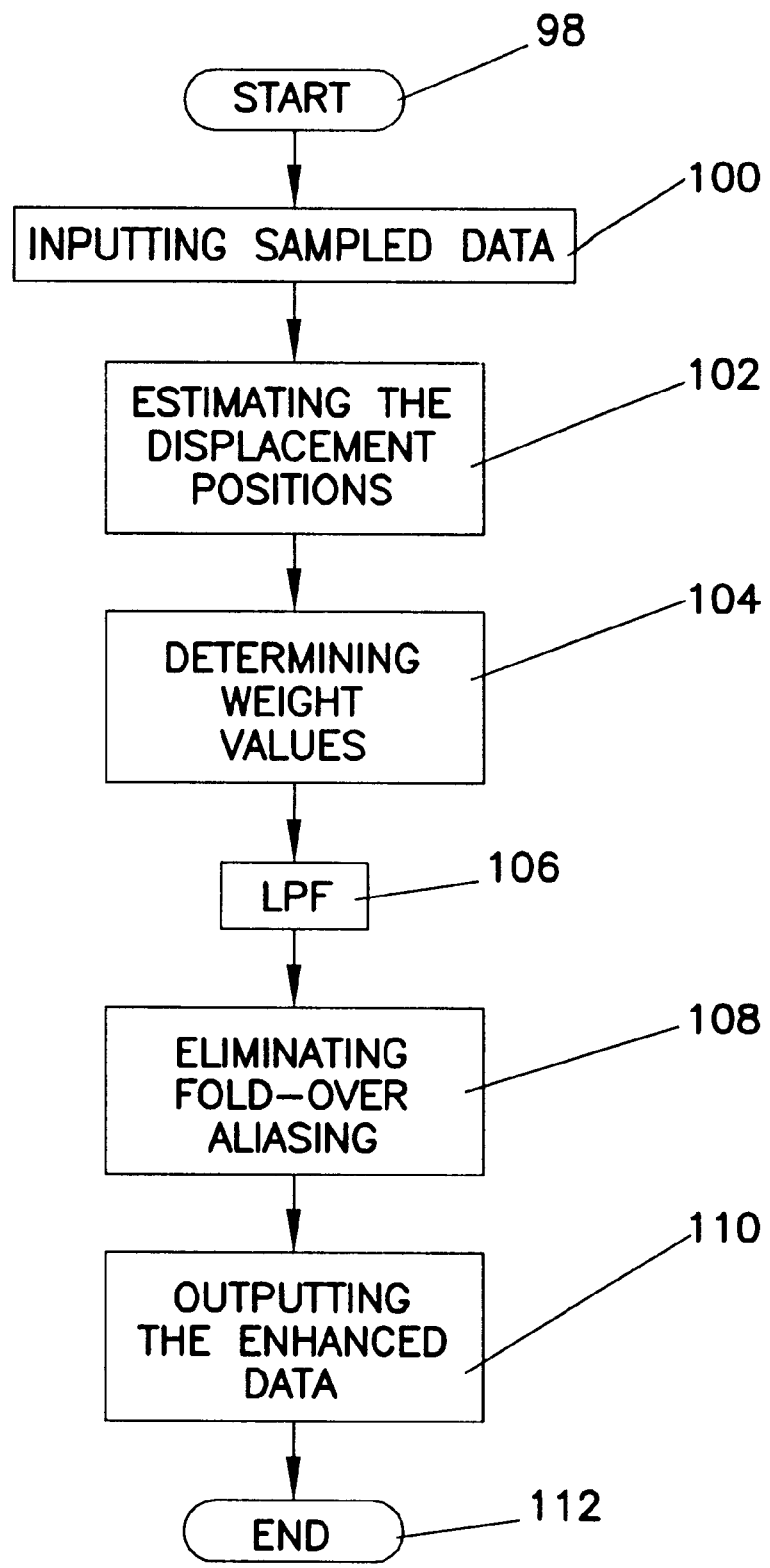
FIG. 4 is a flow chart illustrating a first preferred method involving steps for reproducing a high-resolution image based upon low-resolution sampled data sets according to the current invention.

The above described inventive concept of the current invention is now described in terms of general steps to be performed in order to practice the current invention. Referring to FIG. 4, one preferred process of reproducing an original signal based upon sampled signals starts with a step 100 of inputting the sampled data. In the alternative, the step 100 is also accomplished by sampling the data sets. In either case, it is assumed that the sampled data sets have the uniformly consistent sampling frequency but the sampling is initiated at displaced positions of the two-dimensional original image. In step 102, the parallel displacement positions are estimated for each sampled data set. Based upon the displaced position, an optimal weight value is determined in a step 104. After the sampled data sets are filtered by a low pass filter in a step 106, undesirable fold-over aliasing noise caused by sampling is substantially eliminated in a step 108 by mutually canceling the noises by the above determined optimal weight values. Lastly, in a step 110, the processed image data sets are outputted. In the following, each step of the above described process or method is more fully described.

Figure 5:
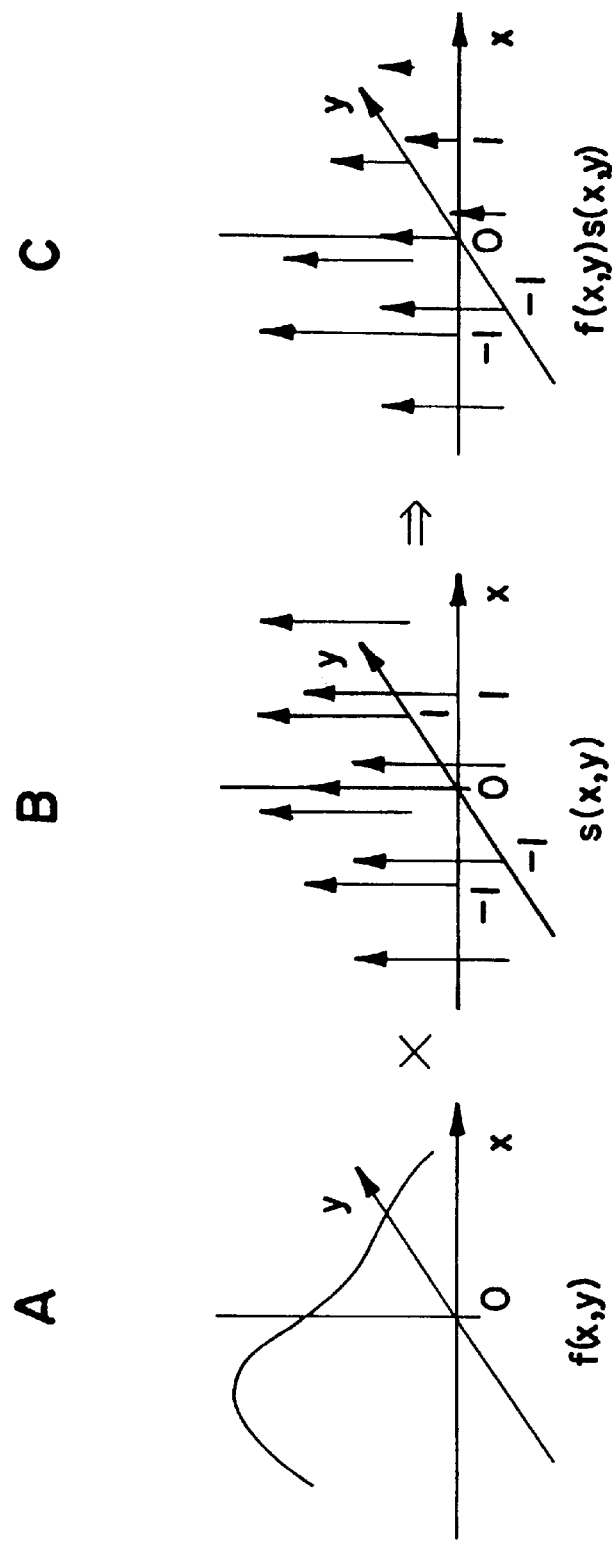
FIGS. 5A–C respectively illustrate an original function, a sampling frequency and sampled data sets in the spacial domain.
Figure 6:
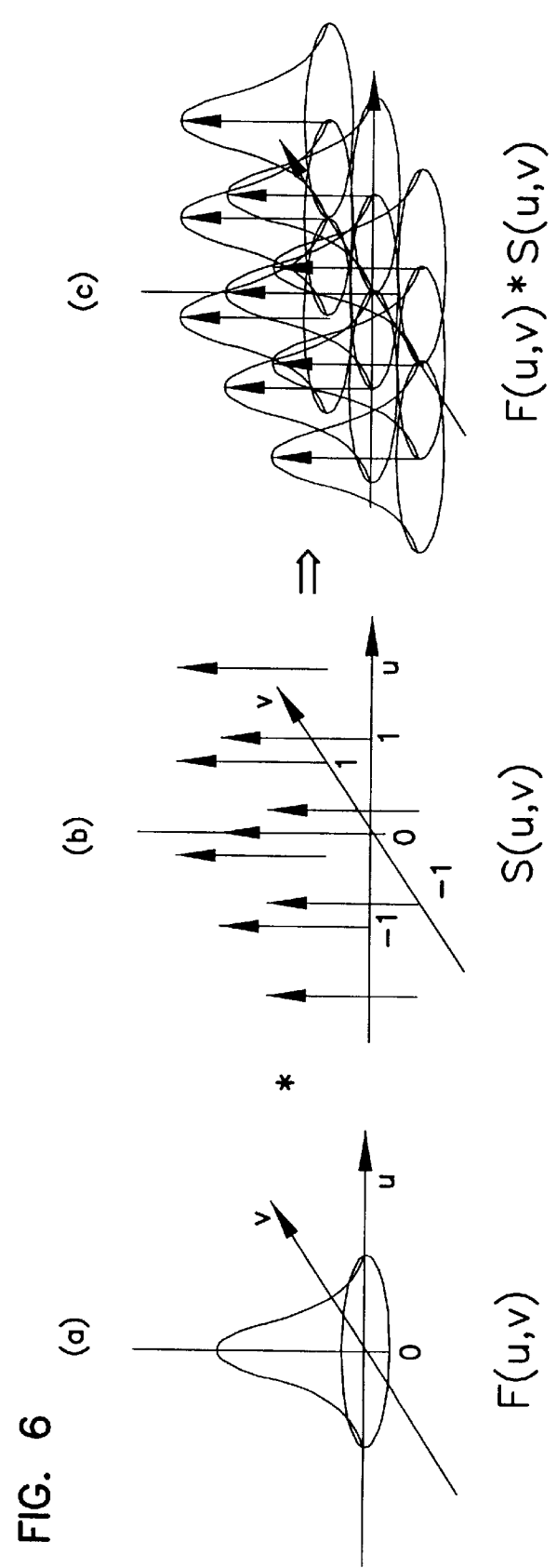
FIGS. 6A–C respectively illustrate an original function, a sampling frequency and sampled data sets in the frequency domain.

Referring to FIGS. 5 and 6, the above described preferred embodiment according to the current invention is designed to process the sampled data in the spacial or frequency domain. In the spacial domain, FIG. 5A illustrates an original two-dimensional signal function f(x, y) to be sampled. For the sake of simplicity, the sampling process is performed at a predetermined frequency of 1 as indicated by arrows in FIG. 5B. The function s(x, y) specifies a sampling frequency and may be expressed in a series of pulses. The product of f(x, y) and s(x, y) signifies the sampled data sets d(x, y) as illustrated in FIG. 5C. The product d(x , y) is defined by the intersecting points between the surface and the sampling frequency pulses.

Now referring to FIGS. 6A–C, the above described spacial sampled data is considered in the frequency space. In order to represent the sampled data in the frequency domain, the spacial domain data is transformed into the Fourier transform as defined below:

$$F[f(x, y)] = F(u, v) = \int f(x, y)\exp(-2\pi i(xu + yv))dx\,dy \quad (1)$$

The Fourier transform is reversed by the following to obtain the original function:

$$f(x,y)=\int F(u, v)\exp(2\pi i(xu+yv))du\,dv \quad (2)$$

Lastly, the convolution of the two functions $f_1$ and $f_2$ is defined as follows:

$$f_1(x,y)*f_2(x,y)=\int f_1(\alpha, \beta)f_2(x-\alpha, y-\beta)d\alpha\,d\beta \quad (3)$$

Similarly, based upon the above definitions, the signal space function s(x, y) in an equation (4) and d(x, y) in an equation (6) are also represented in the frequency domain as respectively designated by S and D in capital letters as follows:

$$s(x, y) = \sum_{k,l} \delta(x - k)\delta(y - 1) \quad (4)$$

$$S(u, v) = \sum_{k,l} \delta(u - k)\delta(v - 1) \quad (5)$$

Using the convolution:

$$d(x, y) = f(x, y)s(x, y) \quad (6)$$

$$\begin{aligned}D(u, v) &= F(u, v)*S(u, v) \\ &= \int F(\alpha, \beta)S(u-\alpha, v-\beta)d\alpha\,d\beta \\ &= \sum_{k,l} F(u-k, v-l)\end{aligned} \quad (7)$$

Referring to FIGS. 6A and 6B, the Fourier transform of an original signal and a sampling frequency is respectively designated as F(u, v) and S(u, v). FIG. 6A illustrates one example of the original signal f(u, v) or its fundamental frequency distribution which appears to be a bell shape. FIG. 6B illustrates one example of the sampling frequency in the frequency domain. This exemplary sampling frequency is defined to be 1 in both the u and v directions. The frequency spectrum of each sampled signal as designated by F(u, v)*S(u, v) is collectively illustrated in FIG. 6C. The frequency spectrum of some of these sampled signals is partially overlapped with each other.

Figure 7:
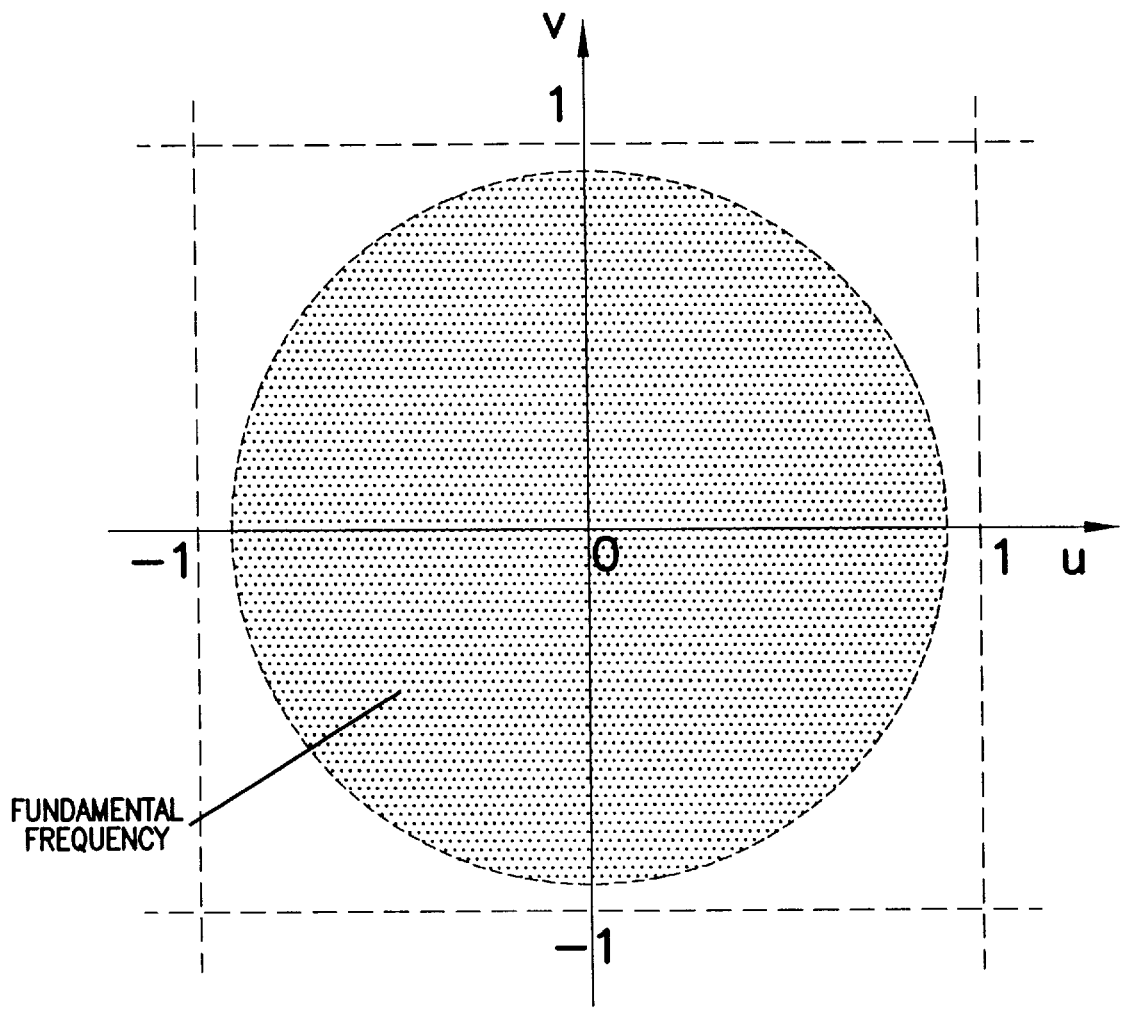
FIG. 7 is an original signal that is limited within frequency twice the Nyquist frequency.

Referring to FIG. 7, a fundamental frequency of the original signal F(u, v) is illustrated as if viewed from the top of FIG. 6A. The frequency domain of the original signal happens to be limited within the frequency range twice the Nyquist frequency, which happens to be ½ in this example. Outside of the range u<-1, 1<u, v<-1 and 1<v, the frequency distribution is zero. Now referring to FIG. 8, the sample frequency data as shown in FIG. 6C is cut at the bottom where the amplitude is zero. The shaded circle signifies a fundamental frequency of the original signal in the frequency domain as also shown in FIG. 7. Surrounding the fundamental frequency, there are eight circles that signify fold-over aliasing noises or harmonics which are caused by the sampling process. The center of each of these harmonics or fold-over aliasing noises coincides with the grids or the sampling frequency as defined above.

Figure 8:
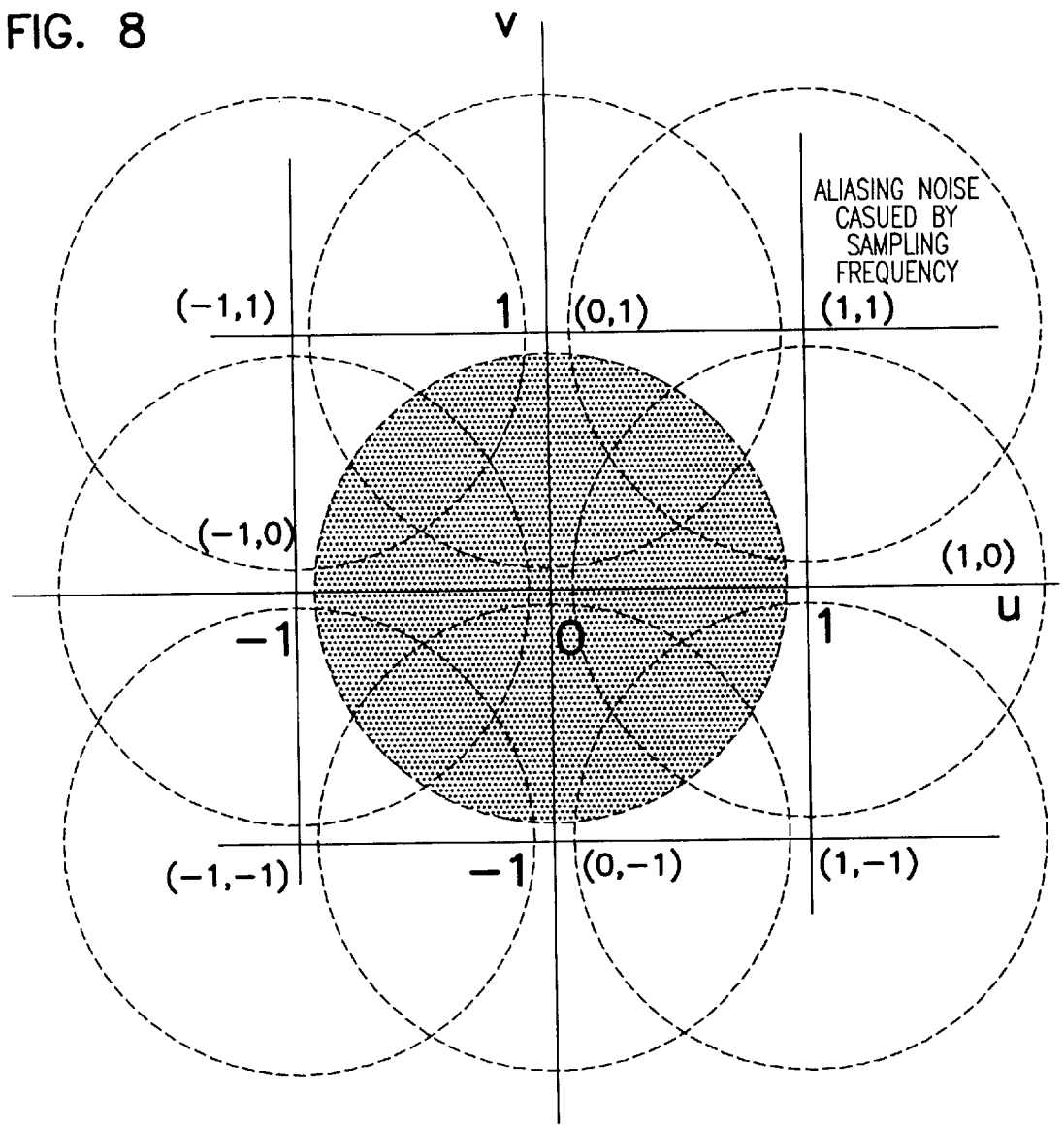
FIG. 8 illustrates fold-over aliasing noises or harmonics caused by sampling an original signal above twice the Nyquist frequency.

FIG. 8 illustrates a situation when the original signal covers the thrice Nyquist frequency in the U direction and the twice Nyquist frequency in the V direction. There are fourteen fold-over aliasing noise areas or harmonics surrounding a fundamental frequency since k takes a value of −2, −1 0, 1, or 2 while l takes a value of −1, 0 or 1.

In the above described sampling data in th frequency domain, the sampling was assumed to be taken by initiating at the same location of the original signal or image. However, according to one preferred embodiment of the current invention, the original image is sampled for a predetermined number of times at the same sampling frequency but at parallel displacement positions. In other words, the original image is displaced in the X, Y or XY direction before sampling each data set at the identical sampling frequency. Alternatively, by positioning the original image at the same location, the sampling is initiated at parallel displacement positions. If the above described parallel displacement amount is designated by p and q, and the sampled data is designated as $d_{pq}$ or $f(x,y)*s(x-p, y-q)$, the sampling function s in the frequency domain thus becomes:

$$F[s(x-p, y-q)] = \exp(-2\pi i(pu+qv))S(u, v) \qquad (8)$$

The above equation (8) indicates that the parallel displacement positions in the frequency space, $S(u,v)$ is proportional to $(pu+qv)$ in its phase. In other words, the phase of the harmonics or fold-over aliasing noise is proportionally shifted by the amount of parallel displacement positions. By the same token, the Fourier transform of $d_{pq}$ is designated by $D_{pq}$ and is expressed by the following equation:

$$\begin{aligned} D_{p,q}(u, v) &= F[f(x, y)s(x - p, y - q)] \qquad (9) \\ &= F(u, v) * \exp(-2\pi i(pu + qv))S(u, v) \\ &= \sum_{k,l} \exp(-2\pi i(pk + ql))F(u - k, v - l) \end{aligned}$$

Accordingly, a fundamental frequency (k=0, l=0) does not depend upon a displacement position (p,q) while a harmonics or a fold-over aliasing noise (k≠0, l≠0) whose phase is shifted by the amount $-2\pi(pk,ql)$.

Based upon the above described sampled data, the original image is reproduced by performing the steps 102–108 of FIG. 4. In the step 102, the parallel displacement positions are estimated for the sampled data are according to predetermined procedures. However, this estimation step is optionally eliminated if the displacement positions are already known. According to one preferred embodiment, the predetermined procedure for determining the above described displacement positions includes the use of the speed and time of the moving original image as described in "A Velocity Vector Field Measurement System Based On Spatio-Temporal Image Derivative" by Shigeru Ando, Keisoku-Jidoseigyo Gakkai Ronbunshu, pp. 88–94 Vol. 22, No. 12 (1986). In short, the distance between the two sampled positions is considered to be a distance covered by an object moving at a constant speed as expressed by a vector (p,q). Using a function $f(x, y, t)$ for describing the movement of the object in the XY direction over a time t, assuming a small change, a rough approximation is obtained by Tayler's series:

$$p\frac{\partial f}{\partial x} + q\frac{\partial f}{\partial y} + \frac{\partial f}{\partial t} = 0 \qquad (10)$$

However, the above approximation is improved by taking a square of the left side of the equation (10) and by finding values of s and t for minimizing the square as shown below:

$$\int \left\{ p\frac{\partial f}{\partial x} + q\frac{\partial f}{\partial y} + \frac{\partial f}{\partial t} \right\}^2 dx\,dy \qquad (11)$$

By substituting each element of the above equation (11) with the following terms that are expressed in terms of the sampled data $in_0[i,j] \ldots in_n[i,j]$:

$$\frac{\partial f}{\partial x} \rightarrow \frac{in_0[i+1, j] - in_0[i-1, j]}{2}$$

$$\frac{\partial f}{\partial y} \rightarrow \frac{in_0[i, j+1] - in_0[i, j-1]}{2}$$

$$\frac{\partial f}{\partial t} \rightarrow in_n[i, j] - in_0[i, j]$$

$$\int dx\,dy \rightarrow \sum_{i,j}$$

As a result, the equation below shows $p_n$ and $q_n$ are now available in stead of s and t by the method of least squares.

$$\sum_{i,j} \left\{ -p_n \frac{(in_0[i+1, j] - in_0[i-1, j])}{2} - q_n \frac{(in_0[i, j+1] - in_0[i, j-1])}{2} + (in_n[i, j] - in_0[i, j]) \right\}^2$$

In the step 104 of FIG. 4, based upon the above determined estimated displacement positions, optimal weight values are determined for each sampled data set. In general, the weight values are optimally determined so that terms involving the above described fold-over aliasing noise are canceled with each other. The following equation indicates the sum of the product of the equation (9) and the weight:

$$\sum_n w_n E_n(u, v) = \sum_n w_n \sum_{k,l} \exp(-2\pi i(p_n k + q_n l))F(u - k, u - l) \qquad (12)$$

where $W_n$ is an optimal weight value for the corresponding term. The equation (12) is now rewritten as follows:

$$= \sum_n w_n F(u, v) + \qquad (13)$$

$$\sum_n w_n \exp(-2\pi i(-p_n - q_n))F(u+1, v+1) + \qquad (14)$$

$$\sum_n w_n \exp(-2\pi i(-p_n))F(u+1, v) + \qquad (15)$$

$$\sum_n w_n \exp(-2\pi i(-p_n + q_n))F(u+1, v-1) + \qquad (16)$$

$$\sum_n w_n \exp(-2\pi i(-q_n))F(u, v+1) + \qquad (17)$$

-continued $$\sum_n w_n \exp(-2\pi i(q_n)) F(u, v-1) + \quad (18)$$

$$\sum_n w_n \exp(-2\pi i(p_n - q_n)) F(u-1, v+1) + \quad (19)$$

$$\sum_n w_n \exp(-2\pi i(p_n)) F(u-1, v) + \quad (20)$$

$$\sum_n w_n \exp(-2\pi i(p_n + q_n)) F(u-1, v-1) \quad (21)$$

To accomplish the above described purpose, the weight values have to satisfy the following conditions:

$$\sum_n w_n = 1 \quad (22)$$

$$\sum_n w_n \exp(2\pi i(-p_n - q_n)) = 0 \quad (23)$$

The equation (22) allows that the original frequency function $F(u, v)$ as indicated in the term (13) to be intact while the equation (23) specifies that term (14) involving the fold-over aliasing noise to be zero. The equation (23) is also expressed as follows:

$$\sum_n w_n \cos(-p_n - q_n) = 0 \quad (24)$$

$$\sum_n w_n \sin(-p_n - q_n) = 0 \quad (25)$$

By the same token, terms (15) through (20) involving the fold-over aliasing noise should be canceled with each other by selecting optimal weight values. In other words, for (k, l)=(−1, −1); (−1, 0); (−1, 1); and (0,−1), the following conditions should be met to determine the optimal weight values:

$$\sum_n w_n \exp(2\pi i(p_n k + q_n l)) = 0 \quad (26)$$

The above equation (26) also means the following:

$$\sum_n w_n \cos(p_n k + q_n l) = 0 \quad (27)$$

$$\sum_n w_n \sin(p_n k + q_n l) = 0 \quad (28)$$

As a result of the cancellation of the terms due to the optimally selected weight values, the summation results in the original function without any undesirable noise caused by the sampling process as follows:

$$\sum_n w_n E_n(u, v) = F(u, v) \quad (29)$$

In order to reproduce $F(u, v)$, the equations (22), (27) and (28) should be solved for $w_n$ using nine equations. Four pairs of k and l values should be substituted into each of equations (27) and (28), and nine data sets $d_0(x, y)$–$d_8(x, y)$ are necessary. Since these are simultaneous linear equations, the solutions for $w_n$ are easily found by using matrix operations.

The weight values determination steps are performed based upon the assumption that no additional noise exists in the sampled data sets. In general, when a plurality of signals includes a noise distribution $\sigma^2$, the additional noise of the average weighted signal is:

$$\sigma^2 \sum_n w_n^2 \quad (30)$$

In other words, since the additional noise in the equations (22) and (26) is not considered, the summation of the squared weight values could potentially become so large that the cancellation effect of the aliasing noise may be weakened. In order to account for the noise in the signal reproduction, according to a second preferred process of the current invention, the weight values are determined using an additional constraint that the equation (30) is minimal. This minimization is determined by the Lagrange's method of intermediate coefficients.

According to a third preferred process, a square of the following absolute value is taken as follows:

$$\left\| \sum_n w_n \exp(2\pi i(p_n k + q_n l)) \right\|^2 \quad (31)$$

The above square does not have be zero in order to substantially eliminate the noise. By determining the weight values that minimize the above square, the additional noise is also minimized.

According to a fourth preferred process, the combination of the equations (30) and (31) is used as an evaluator of the noise as follows:

$$(1-\alpha) \sum_{k,l} \left\| \sum_n w_n \exp(2\pi(p_n k + q_n l)) \right\|^2 + \alpha \sum_n w_n^2 \quad (32)$$

By minimizing the above equation (32), the overall noise is also minimized. However, more specific control is gained by adjusting the constant value in the equation (32). When the constant $\alpha \approx 1$, the noise of the fundamental frequency is more readily reduced. On the other hand, $\alpha \approx 0$, the fold-over aliasing noise is more readily reduced.

In the LPF step 106 of one preferred process, after a wide band low-pass filter (LPF) is used to screen certain frequencies, the resolution of the sampled image data sets is increased by a predetermined amount. Assuming continuous input data $in_n[i,j]$ to be filtered by the LPF, the sampled data set $d_0$ is defined as follows:

$$d_n(x, y) = \sum_{i,j} \delta(x-i, y-j) in_i[i, j] \quad (33)$$

In the frequency domain, the wide band LPF is expressed as follows provided that twice the Nyquist frequency is 1.

$$LPF(u, v) = \begin{cases} 1 & \text{if } (-1 \le u \le 1 \text{ and } -1 \le v \le 1) \\ 0 & \text{otherwise} \end{cases} \quad (34)$$

Figure 9:
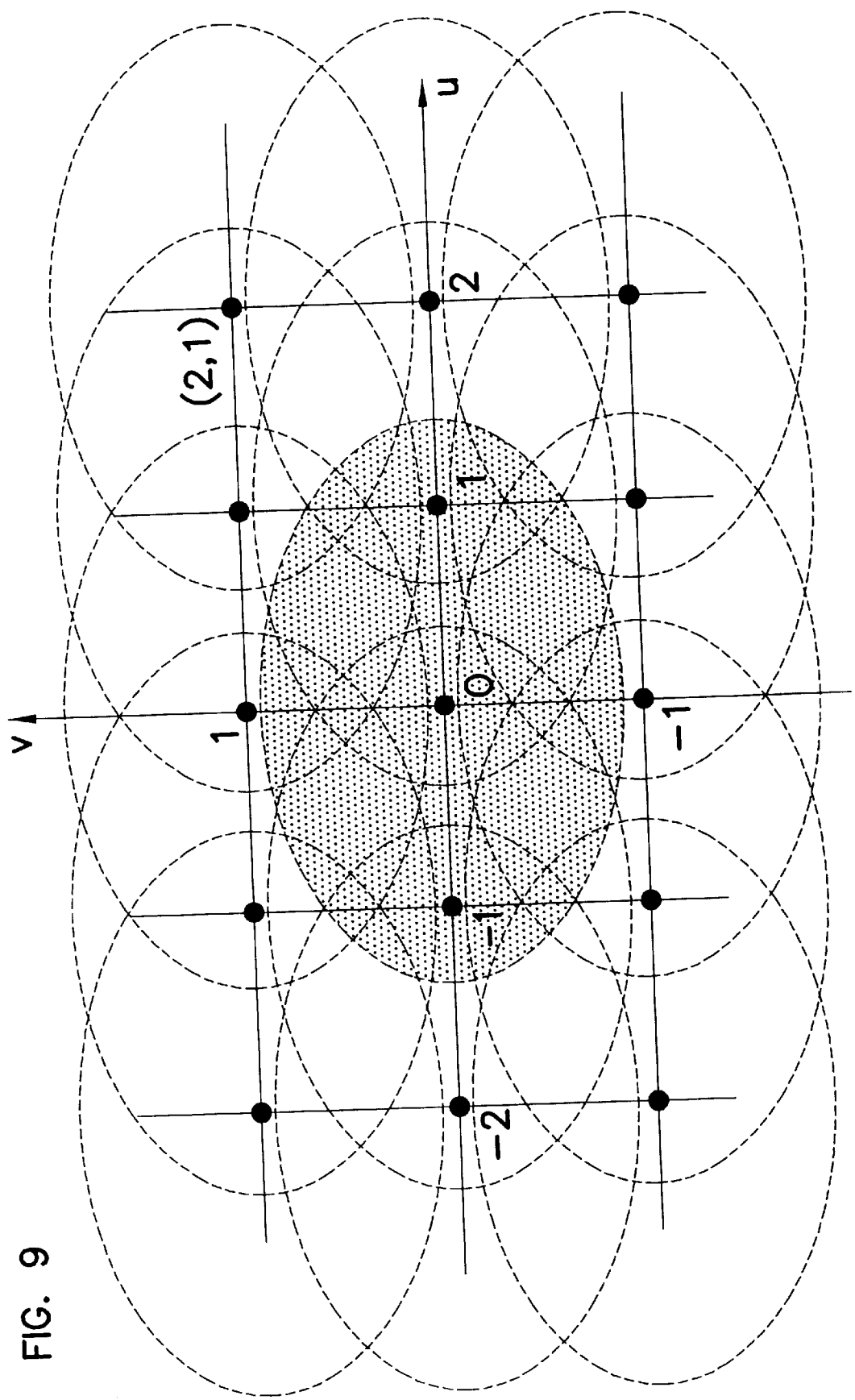
FIG. 9 illustrates fold-over aliasing noises surrounding a fundamental frequency when the original signal covers a frequency range thrice the Nyquist frequency in the U direction and twice the Nyquist frequency in the V direction.

To filter the sampled data as shown in FIG. 9, the above LPF equation (34) is slightly modified so that the LPF returns 1 if $-1.5 \le u \le 1.5$, and $-1.5 \le v \le 1.5$. Otherwise it returns 0. In the spacial domain, the following LPF is alternatively used:

$$\text{sinc2}(x, y) = \text{sinc}(x/2, y/2) \quad (35)$$

$$= \frac{\sin(2\pi x)\sin(2\pi y)}{\pi^2 xy}$$

$e_n$ is defined as the signal filtered by the LPF as expressed in the equation (35), and the product is obtained by convolution:

$$e_n(x, y) = lpf[d_n(x, y)] \quad (36)$$

$$= d_n(x, y) * \text{sinc2}(x, y)$$

$$= \int d_n(\alpha, \beta)\text{sinc2}(x - \alpha, y - \beta) d\alpha d\beta$$

Figure 10:
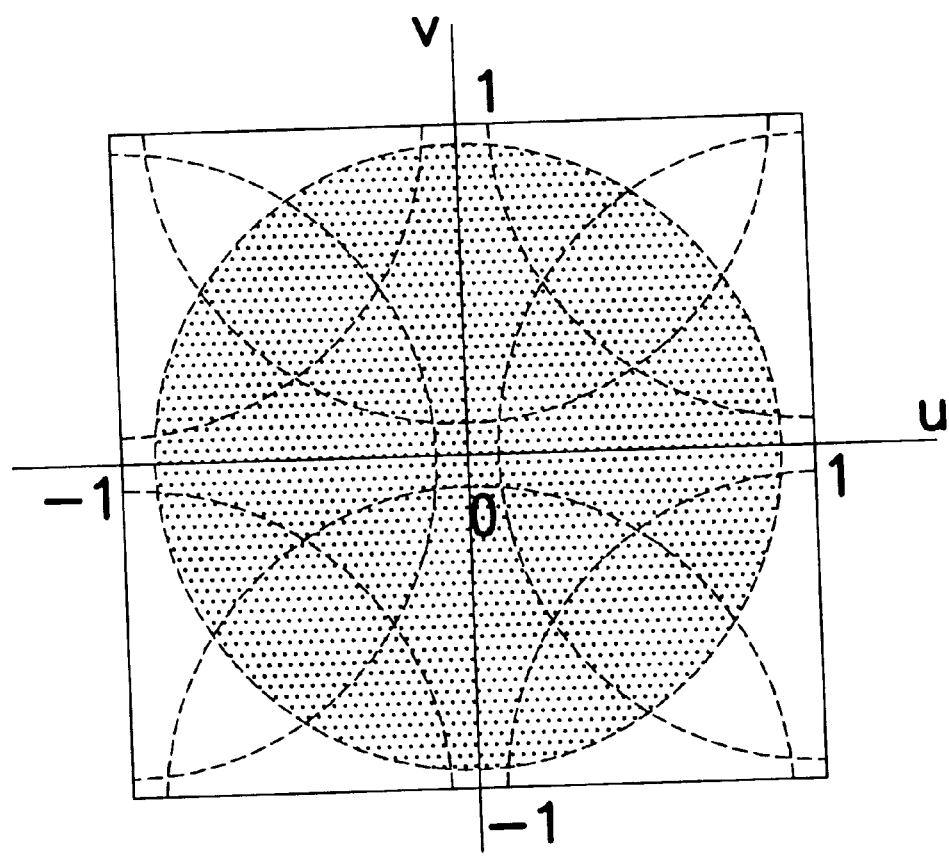
FIG. 10 illustrates the sampled data sets of FIG. 8 that have been processed by a low-pass filter.

One example of filtering the sampled data such as shown in FIG. 8 is illustrated in FIG. 10. In general, certain portions of the fold-over aliasing noise frequencies surrounding the fundamental frequency are filtered while the fundamental frequency is left intact. Using the LPF as defined in the above equation (34), the frequencies of the fold-over aliasing noise in the regions u,v>1 and u,v<−1 are filtered out. As a result of the above filtering process, each quadrant of the fundamental frequency has three overlapping residual fold-over aliasing noise regions.

Figure 11:
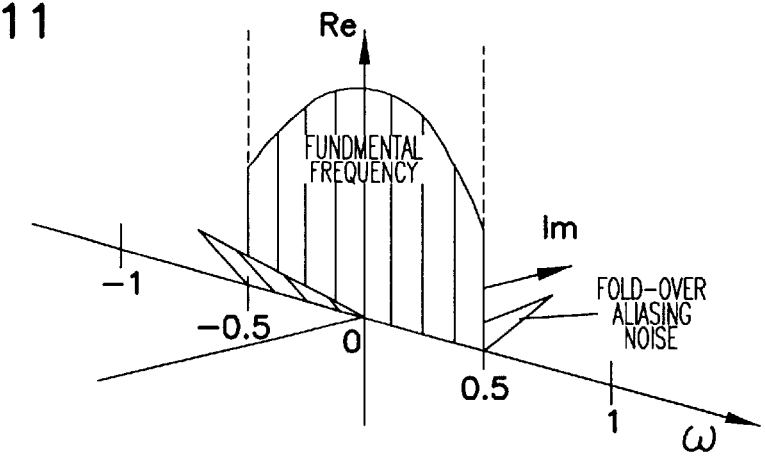
FIG. 11 illustrates one-dimensional fundamental signal with a fold-over signal that is filtered by a low-pass filter with a narrow band width.
Figure 12:
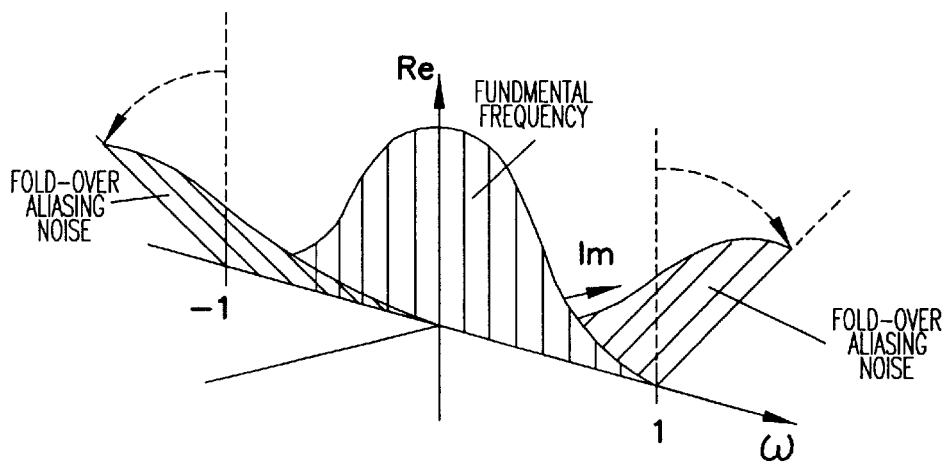
FIG. 12 illustrates the same one-dimensional fundamental signal of FIG. 10 that is filtered by a low-pass filter with a broad band width.
Figure 13:
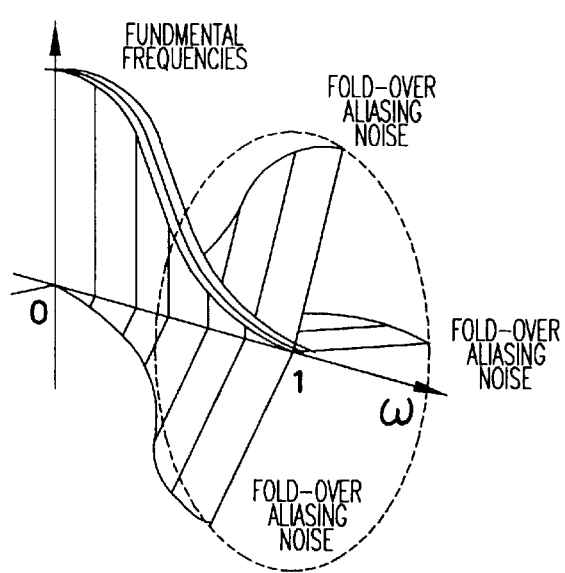
FIG. 13 illustrates three sets of one-dimensional data sampled at three displaced positions.

Referring to FIGS. 11, 12 and 13, the effects of a LPF are illustrated using a one-dimensional signal which simplifies the visual representations. FIG. 11 indicates that the one-dimensional signal is filtered by a LPF having a cut-off frequency at 0.5. Although a significant portion of the fold-over aliasing noise is filter out, at the same time, a high-frequency portion of an original signal is also lost. In comparison to the LPF used in FIG. 11, FIG. 12 indicates that a wide band LPF having the cut off frequency at 1 is applied to the same signal of FIG. 11. As the result of the wide band LPF application, although a larger portion of the fold-over aliasing noise remains in the filtered signal, a substantially full fundamental frequency of the original signal including the high frequency range is left intact as shown in FIG. 12. FIG. 13 illustrates that data sets sampled at displacement positions include fold-over aliasing noises at various angles.

In order to prepare the data for the summation step 108 of FIG. 4, the filtered sampled data sets are now processed to positionally correspond with respect to an original image. The above equation (36) is now expressed in terms of $in_n[i,j]$ which is defined in the equation (33) as follows:

$$e_n(x, y) = \int \sum_{i,j} in_n[i, j]\delta(x - \alpha - i)\delta(y - \beta - j)\text{sinc2}(\alpha, \beta) d\alpha d\beta \quad (37)$$

$$= \sum_{i,j} in_n[i, j]\text{sinc2}(x - i, y - j)$$

The filtered data $e_n(x, y)$ is still a continuous signal. To generate discrete pixel values that positionally correspond to the original image, $e_n$ is processed at positions that contain the corresponding pixel values. The original image is represented by an initial sample data set $in_0$, and the initial data set ino is processed into a high-resolution intermediate data set $mid_0$ by re-sampling. In turn, the positions of elements of the intermediate data set $mid_0$ are considered to be the pixel positions in the original image.

Figure 14:
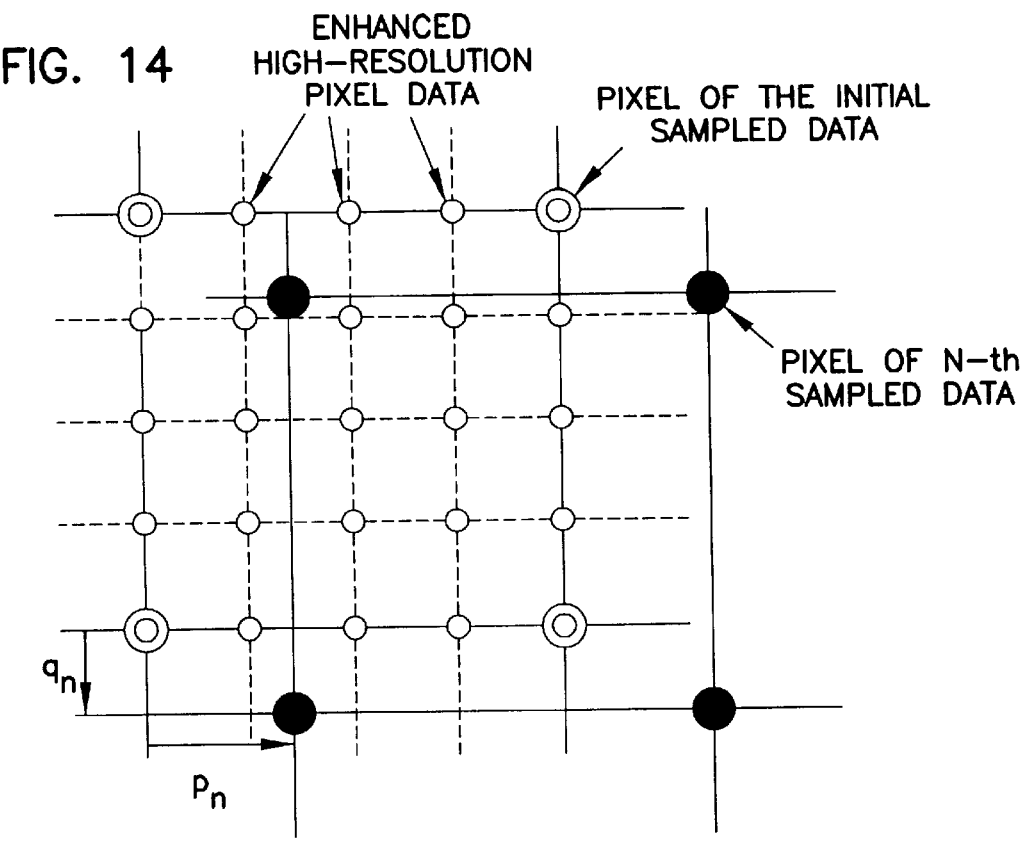
FIG. 14 illustrates a positional relationship between a subsequently sampled data set and an initial data set that has been processed to a high-resolution.

Now referring to FIG. 14, the positional relationships between the initial or standard high-resolution pixels and the n-th sampled data pixels are illustrated. Double circles indicate the positions of the initial data set which is used as a standard pixel positions. The distance between the two double circles indicates the original sampling frequency of 1 and is constant across the sampling data sets. Between the two double circles, additional pixels are placed to increase the resolution, and these high-resolution pixels are designated by single circles. In this example, four additional pixels are added at i/4 and j/4 positions. In other words, the high-resolution is equivalent to 4 times the original sampling frequency. The n-th sampled data set is sampled at a parallel displacement position ($p_n$, $q_n$) and is indicated by solid black circles.

Still referring to FIG. 14, the high-resolution data for the n-th sampled data set is generated based upon the standard high-resolution data set. According to one preferred process, the above described generation step uses the exact positions of the standard high-resolution pixels indicated by small white black circles so as to interpolate the high-resolution pixel values from the nearest n-th sampled data values which are indicated by large solid black circles.

Figure 15:
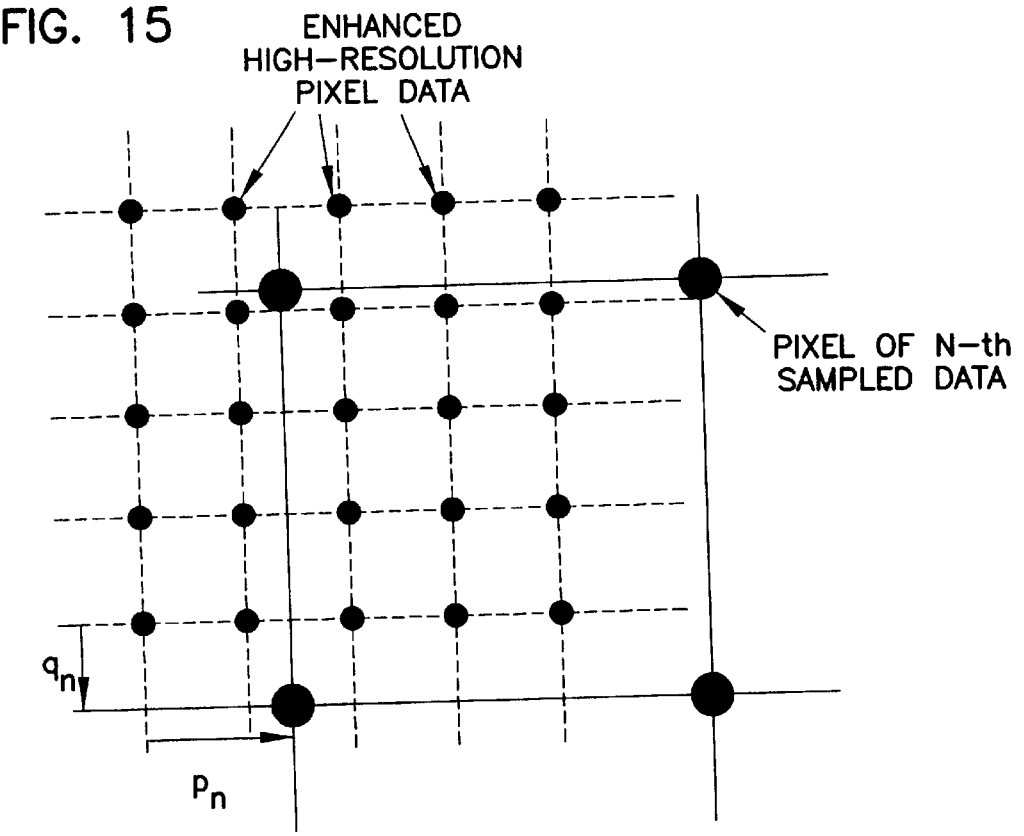
FIG. 15 illustrates a positional relationship between an initial data set and the n-th data set that has been processed to a high-resolution.

Now referring to FIG. 15, the high-resolution pixel positions of the n-th data set are thus the same as those of the standard high-resolution pixels. Since the n-th sampled data set has been displaced by $p_n$ and $q_n$, the positions of the n-th pixel positions are expressed by((i/4)−$p_n$, (j/4)−$q_n$) in this example. The above described step for generating high-resolution pixel values is advantageous since the step is independent from the degree of resolution and any displacement amount is accommodated by interpolation. In other words, even if the displacement amount is significantly less than one pixel due to a large increase in resolution, a precise pixel value is interpolated for the n-th data set. The filtered high-resolution data is stored in $mid_n[i,j]$ as follows:

$$mid_n[i, j] = \sum_{g,h} in_n[g, h]\text{sinc2}\left(\frac{i}{4} - p_n - g, \frac{j}{4} - q_n - h\right) \quad (38)$$

where the resolution is made 4 times higher than the originally sampled data. The resolution of the filtered data should be higher than the original sampling frequency to avoid additional fold-over aliasing noise. According to another preferred embodiment, the intermediate data as defined by the above equation (38) is directly generated without $e_n$. In fact, the equation (38) essentially performs the above-described LPF step as well as re-sampling process at the same time.

The step 108 for substantially eliminating the fold-over aliasing noise as shown in FIG. 4 is finally accomplished by summing the product of the above described optimal weight value and the high-resolution data as follows:

$$out[i, j] = \sum w_n mid_n[i, j] \quad (39)$$

Lastly, in a step 110, the above defined out[i,j] is outputted as an enhanced reproduced image data.

Figure 16:
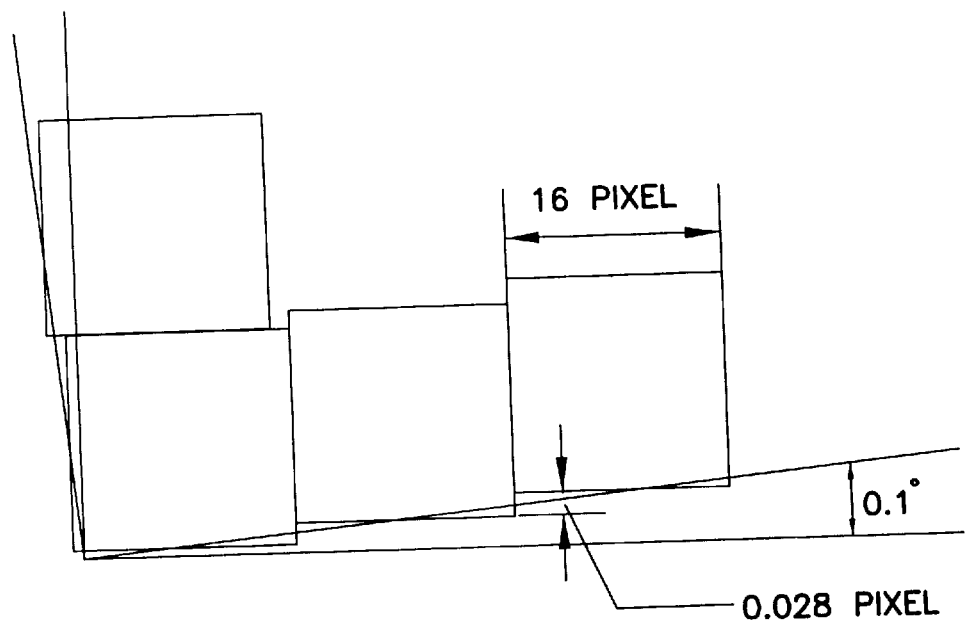
FIG. 16 illustrates an example of rotated or tilted original image during a sampling process.

Referring to FIG. 16, according to the above preferred method, it is assumed that the above described sampled data is obtained when the original image is at parallel displacement positions without rotation. In reality, this assumption for no rotation is not always true. For example, in collecting the sampled data, if the original image is to be manually placed at the displacement positions, the original image is likely to be slightly rotated at the same time. For example, as shown in FIG. 16, if the original image is rotated by 0.1° about one end of a 640-pixel row in the x direction, the amount of displacement at the other end of the pixel row is approximately one pixel in the y direction. The above statement is based upon the following approximation: sin (0.1°)·640≈1.1 To substantially eliminate the fold-over aliasing noise, the input data is intentionally sampled at displacement positions. However, the above described undesirable rotation-induced displacement was not taken into account in the above described preferred process.

To compensate for the rotated image in sampling, in general, the sampled data is divided into small blocks. Still referring to FIG. 16, when the original image is divided into 16×16 pixel blocks, the 0.1° rotation now causes a substantially smaller displacement at each block. The substantially reduced displacement is estimated to be 0.028 pixel based upon the calculation, sin(0.1°)·16≈0.028. Because of this infinitesimal displacement amount in rotation, each block is now considered to have been displaced in parallel without rotation. Thus, the divided blocks is individually processed to reproduce an original image based upon sampled data sets.

Figure 17:
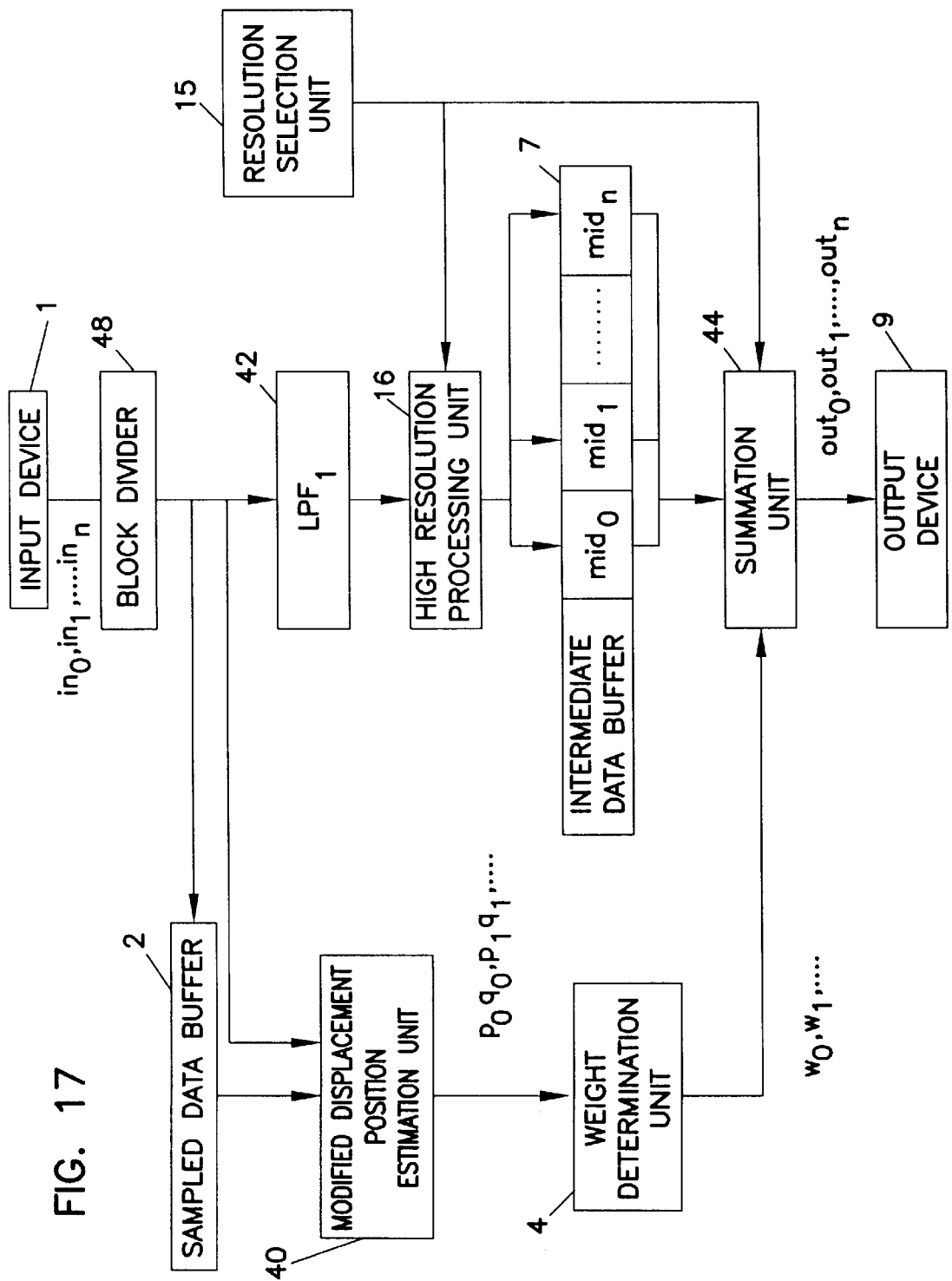
FIG. 17 is a block diagram illustrating a second preferred embodiment of the system for reproducing a high-resolution image based upon rotated low-resolution sampled data sets according to the current invention.

Referring to FIG. 17, one preferred embodiment of the system for generating high-resolution data based upon the rotated original image according to the current invention includes the substantially similar components as described with respect to FIG. 3. These corresponding elements perform substantially the same tasks on each of the divided blocks of the sampled data set. For example, a weight determination unit 4 determines an optimal weight value for each block. For this reason detailed descriptions of other corresponding elements are incorporated herein from those provided with respect to FIG. 3. However, further descriptions are necessary for the following exceptional components.

The preferred embodiment for the rotated original image includes the modified displacement position estimating unit 40'. Because of the rotation, after the initial displacement position estimation for each block, the estimation unit 40' further processes the estimated displacement positions by approximation so that there is an overall smooth transition among the blocks. The preferred embodiment for the rotated original image additionally includes a block divider 48 for dividing each of the sampled data sets into a predetermined number of blocks.

Figure 18:
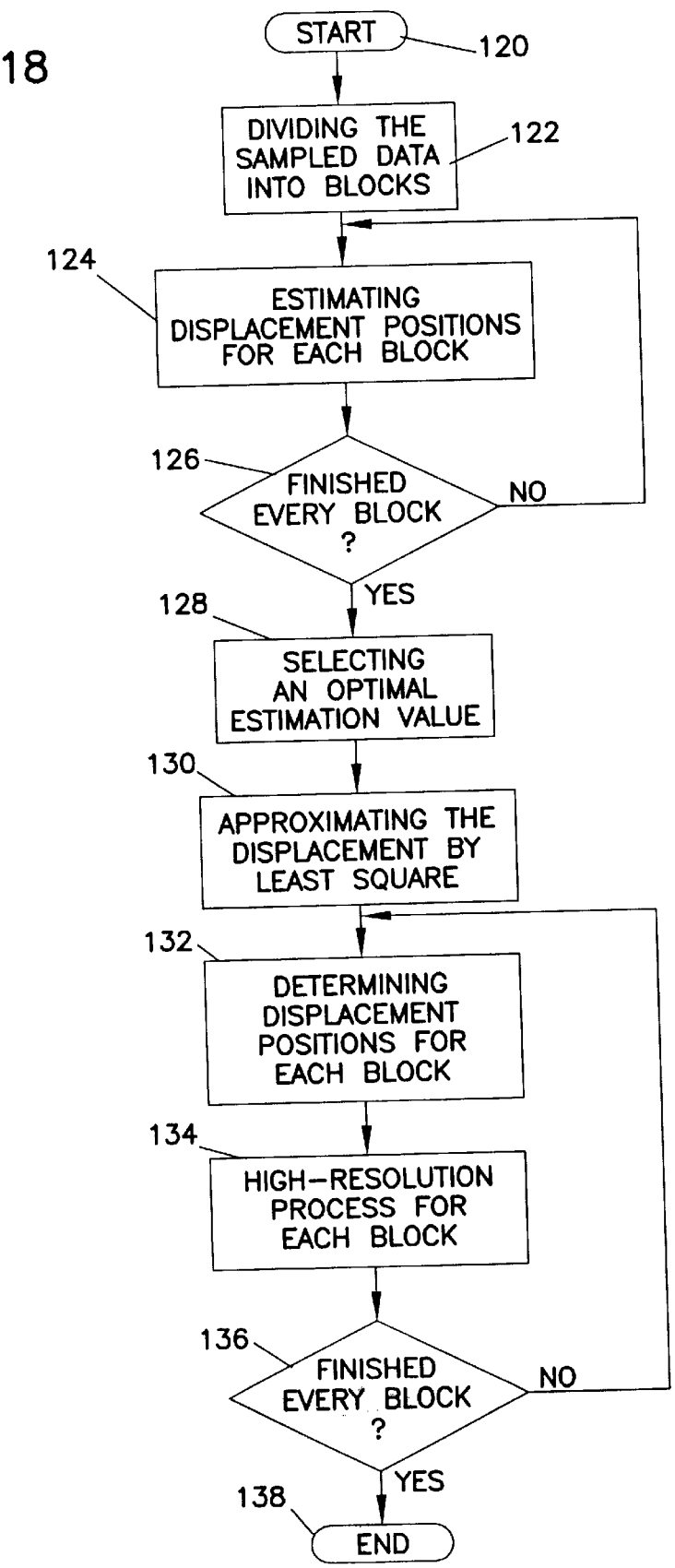
FIG. 18 is a flow chart illustrating a second preferred method involving steps for reproducing a high-resolution image based upon rotated low-resolution sampled ata sets according to the current invention.
Figure 19:
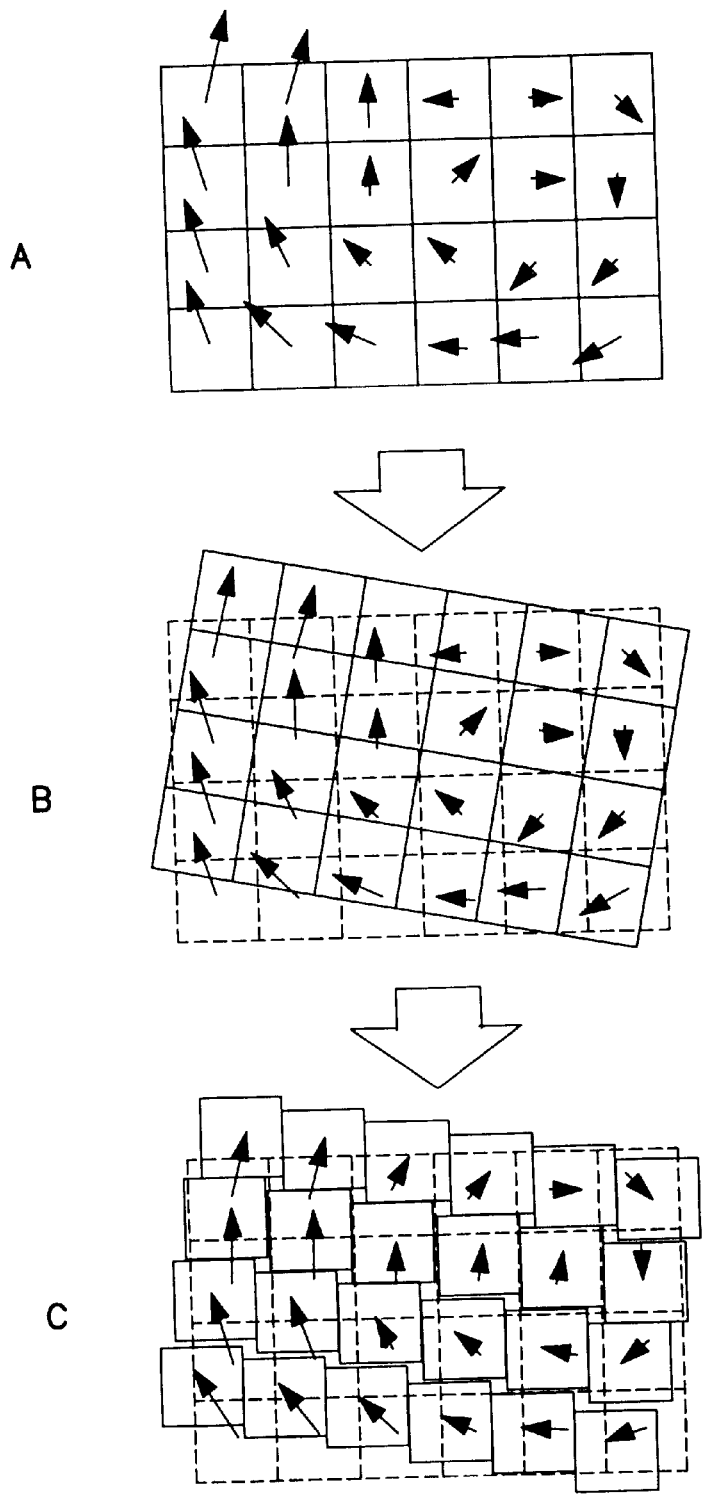
FIGS. 19A–C respectively illustrate a process of estimating the position of each block, approximating the function and reconstructing based upon approximated values according to the current invention.

Now referring to FIG. 18, one preferred process according to the current invention includes steps of reproducing a high-resolution original image based upon low-resolution data sampled from the displaced and rotated original image. In a step 120, the input data sets as described with respect to FIG. 4 are provided for further processing. In a step 122, each sampled data set is divided into a predetermined size of blocks such as 16×16 pixel blocks on 32×32 pixel blocks. Although the size of each block is not limited to any particular size, in general, the smaller the block size becomes, the more processing is repeated and the more susceptible to noise the blocks become. On the other hand, if the block size is large, the effect of rotation becomes significant on each block and cannot be ignored. The trade off in size leads to an alternative process which does not utilize the uniform block size throughout the process. In other words, the block size is changed from one step to another so that the optimal size is used for a given step.

In a step 124, the displacement position of each block is estimated as described with respect to the step 102 of FIG. 4. However, a given block is compared to the corresponding block in the initial/standard sampled data set. The detail descriptions of the estimating steps are herein incorporated from the above. This block displacement position estimation step 124 is repeated until every block is examined and confirmed in a step 126. After the displacement position is estimated for each block, the blocked sampled data set is diagrammatically illustrated as shown in FIG. 19A. The arrows respectively indicate the direction and magnitude of the displacement of each block in the sampled data set with respect to the corresponding block in the initial/standard data set.

Figure 20:
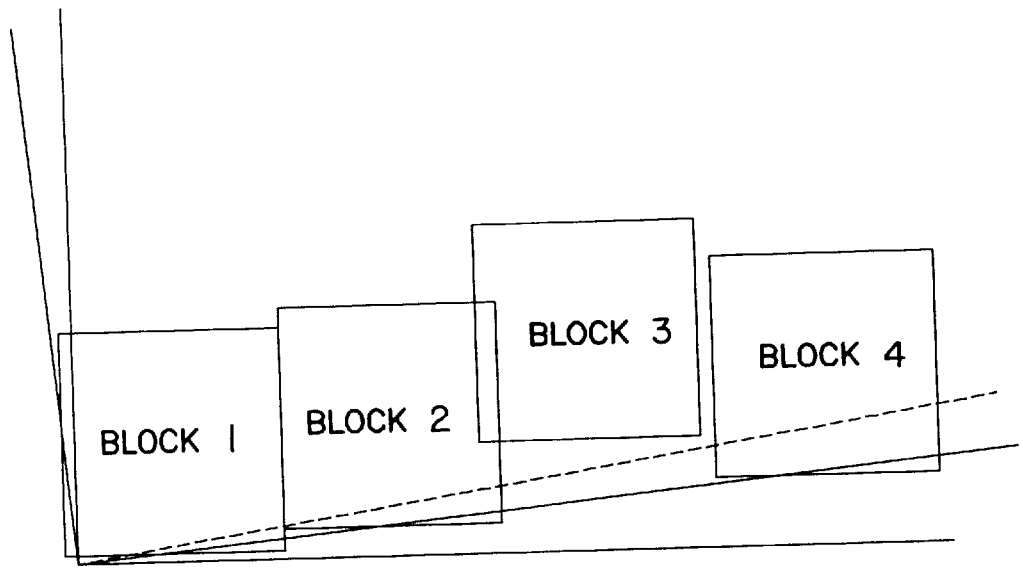
FIG. 20 illustrates a correct sampling position and an erroneous sampling position for a rotated original image.

Referring back to FIG. 18, in a step 128, individually estimated displacement positions are further processed for achieving an overall smooth transition. The above processing is necessary since the individual blocks are susceptible to noise, and the estimated displacement positions are greatly affected by it. However, the step 128 should not take an average of the displacement positions. Such an average would spread the local noise into surrounding blocks. The effect of local aberrations is illustrated in FIG. 20. The displacement positions of divided blocks 1, 2 and 4 have been estimated in a substantially correct manner. However, assuming that a block 3 has some unknown noise, the displacement position of the block 3 has been wrongly estimated due to the noise. FIG. 20 also illustrates that the overall displacement position of all the blocks 1–4 has erroneously approximated based upon the individually estimated displacement positions. Because of the noise-contaminated displacement positions of the block 3 the overall approximation becomes inaccurate.

Figure 21:
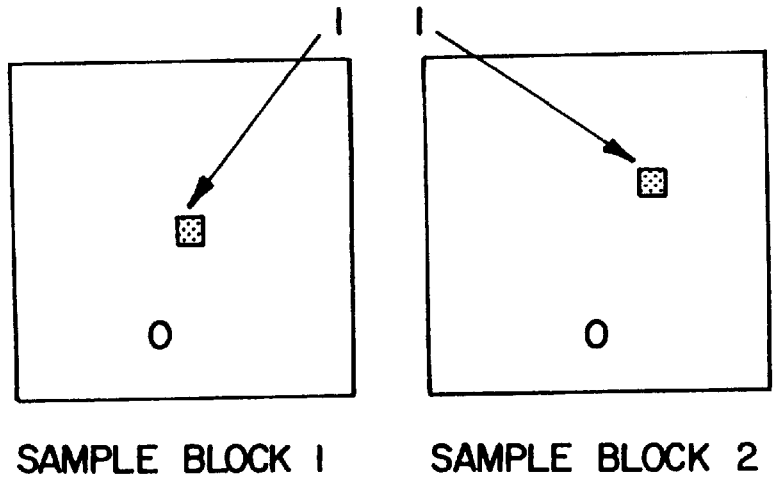
FIG. 21 illustrates a situation where one block has no significant land mark to be used for estimating a displacement position and a noise can be erroneously used as a land mark.
Figure 22:
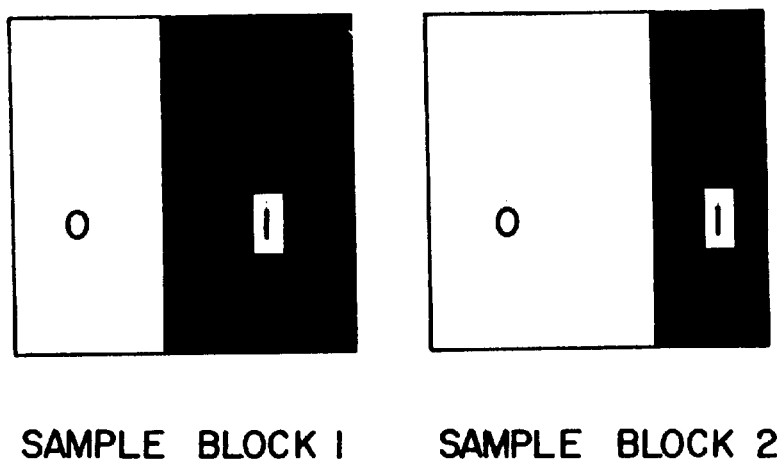
FIG. 22 illustrates another situation where one block has a land mark to be used for estimating a displacement position in one direction but no significant land mark in the other direction.

Specific factors affecting the estimation of displacement positions include pixel value patters of a block in an original image. For example, if a particular block in a sample data set lacks a particular land mark and has just white back ground or no change in pixel values, it is difficult to estimate the displacement amount from the corresponding block in an standard data set. Under these circumstances, it is likely that a noise is mistakenly used as a land mark, and the estimated displacement positions become grossly inaccurate. FIG. 21 illustrates the above described circumstances where a sample block 1 contains a noise 1 in a exclusive white 0 background while the corresponding block 2 accidentally contains a similar noise 1. Because of these corresponding similar noise, the displacement positions of the block 2 with respect to the block 1 are inaccurately estimated. FIG. 22 illustrates another example of the block which likely results in an inaccurately estimated displacement position. A block 1 corresponds to a block 2, and each block has a white area 0 and a black area 1. The direct comparison of these blocks allows a relatively accurate displacement amount in the x direction but not in the y direction. The y displacement estimate is likely to be affected by noise.

Referring back to the step 128 in FIG. 18, in order to accurately approximate the overall displacement positions without being affected by a local noise, one approach is to exclude a block affected by the noise from the approximation of the displacement positions. Such exclusion generally increases the accuracy of the estimated displacement positions. One preferred process according to the current invention uses an exclusion criterion based upon a comparison of a certain term with a predetermined threshold value.

As described above, the displacement position is estimated by finding the values of a speed p and a time q which minimize the equation (11). The parameters and t are now independently expressed as follows:

$$p = \frac{S_{yt}S_{xy} - S_{xt}S_{yy}}{S_{xx}S_{yy} - S_{xy}^2} \quad (40)$$

$$q = \frac{S_{xt}S_{xy} - S_{yt}S_{xx}}{S_{xx}S_{yy} - S_{xy}^2} \quad (41)$$

The denominator term of the above equations (40) and (41) becomes 0 when the original block contains the same pixel values. In other words, when the denominator is substantially near zero, the block lacks a significant land mark for accurately estimating the displacement positions. The denominator is obtained by the following relations:

$$S_{xx} = \sum_{i,j} \left( \frac{(in_0[i+1, j] - in_0[i-1, j])}{2} \right)^2 \quad (42)$$

$$S_{yy} = \sum_{i,j} \left( \frac{(in_0[i, j+1] - in_0[i, j-1])}{2} \right)^2 \quad (43)$$

$$S_{xy} = \sum_{i,j} \left( \frac{(in_0[i+1, j] - in_0[i-1, j])}{2} \frac{(in_0[i, j+1] - in_0[i, j-1])}{2} \right) \quad (44)$$

where $in_0[i,j]$ is an initial/standard input data set. To eliminate unreliably or invalidly estimated displacement positions, each denominator value is compared against a predetermined threshold value. If the denominator value is below the threshold value or near zero, the associated estimated displacement positions are not used for the further approximation.

In a step 130, the above selected estimated displacement positions are used for further approximating displacement positions. One preferred method of the current invention uses the affine approximation since the least square approximation is suited for magnification, reduction and rotation and is easily obtained using matrix operations. When individually estimated relative displacement amounts selected in the step 128 are expressed as $p_n$ and $q_n$, and the center of the n-th block is expressed as $x_n$ and $y_n$, the affine approximation is defined as follows:

$$\sum_n \left\| \begin{pmatrix} a & b \\ c & d \end{pmatrix} \begin{pmatrix} x_n \\ y_n \end{pmatrix} + \begin{pmatrix} e \\ f \end{pmatrix} - \begin{pmatrix} p_n \\ q_n \end{pmatrix} \right\|^2 \quad (45)$$

By finding the values of parameters a, b, c, d, e and f which minimize the sum of the absolute terms in the above equation (45), the data sets selected in the step 128 are now optimally approximated. The above minimal values are obtained by the linear least square method using matrix operations. To illustrate the effect of the approximation, the solid lines in FIG. 19B diagrammatically indicate the affaine approximated block displacement positions in the n-th selected data while the dotted lines indicate the standard/ initial data set.

Again referring back to FIG. 18, in a step 132, by using the above obtained parameters a–f, the displacement positions of each block is now re-evaluated. In further approximating the displacement positions, the size of the re-evaluated blocks does not have be the same as the one used for the previous position estimations. The re-evaluated displacement positions $r_m$ and $s_m$ of a m-th block having the center position $x_m$ and $y_m$ is now expressed using the parameters a–f as follows:

$$\begin{pmatrix} r_m \\ s_m \end{pmatrix} = \begin{pmatrix} a & b \\ c & d \end{pmatrix} \begin{pmatrix} x_m \\ y_m \end{pmatrix} + \begin{pmatrix} e \\ f \end{pmatrix} \quad (46)$$

To illustrate the above further approximated displacement positions, FIG. 4C indicates that each newly evaluated block in solid lines is now at a displacement position substantially in parallel to the corresponding block of the initial/standard data set as shown in dotted lines. Furthermore, the tip of each arrow indicates the newly evaluated positions $r_m$ and $s_m$.

Figure 23:
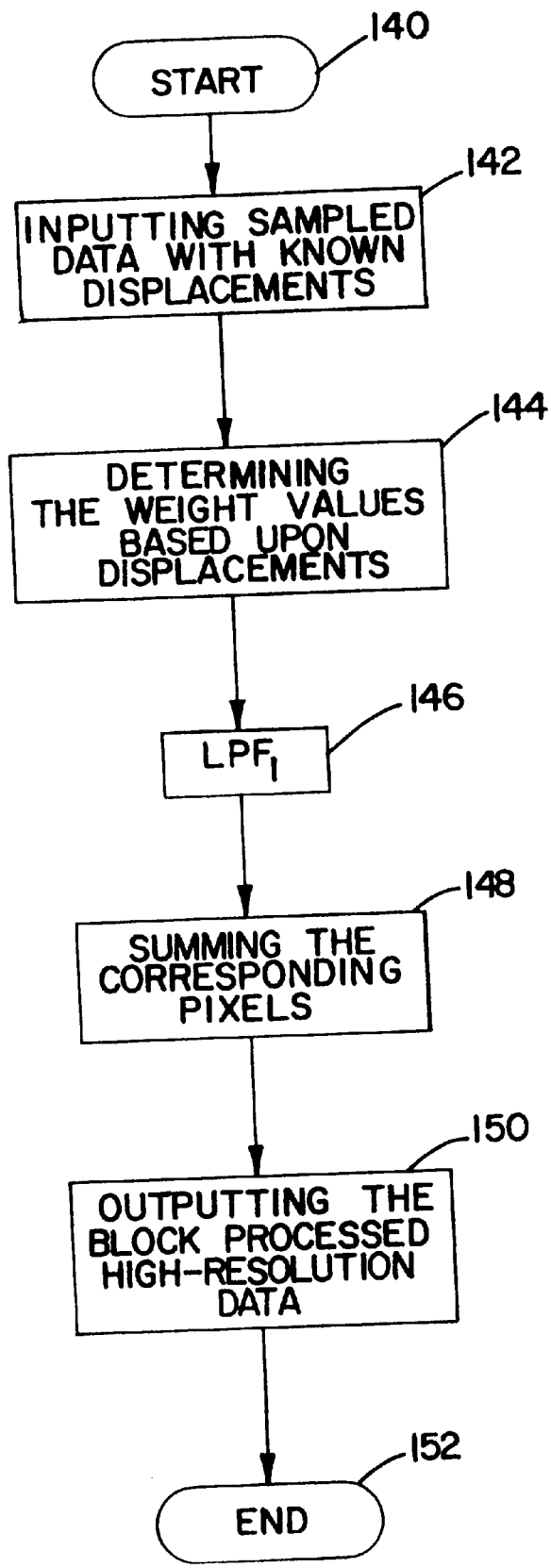
FIG. 23 is a flow chart illustrating a preferred method involving detailed steps for processing each block as referred to in FIG. 18 according to the current invention.

Referring back to FIG. 18, in a step 134, for each of the blocks approximated at parallel displacement positions, high-resolution processing steps are performed. Although these high-resolution processing steps are substantially similar to the ones already described with respect to an undivided sampled data set, FIG. 23 is a flow chart for sub-steps 140 through 152 which are a part of the step 134 of FIG. 18. In general, after the approximated block data is entered in a step 140, based upon the approximated parallel displacement positions, an optimal weight value is determined in a sub-step 144. In a step 146, the block data is filtered through a low pass filter (LPF), and the resolution of the filtered block data is also increased. In a step 148, the weighted corresponding block pixels is summed in order to substantially eliminate a fold-over aliasing noise. Lastly, in a step 150, a block output is generated. Now referring back to FIG. 18, the above described steps 132 and 143 are repeated for every block of each sampled data set. When every block has been completed as confirmed in a step 136, the preferred method for reproducing a high-resolution based upon the rotated original image terminates in a step 138.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of reproducing a high-resolution original image from a plurality of low-resolution image data sets, comprising the steps of:
    a) sampling an original image at a predetermined sampling resolution for a predetermined number of times so as to compile a predetermined number of the low-resolution image data sets, each of said sampled image data sets representing said original image at parallel displacement positions;
    b) substantially eliminating fold-over aliasing noises caused by sampling the low-resolution image data sets during said step a), said step b) further comprising additional steps of:
        h) for each sampled image data set, summing terms involving a product of each of said fold-over aliasing noises and a corresponding weight value;
        i) adjusting said weight value so as to cancel said terms involving said fold-over aliasing noises with each other; and
    c) reproducing the original image at least at an original resolution from the low-resolution image data sets after said step b).

2. The method of reproducing a high-resolution original image according to claim 1 wherein said original image includes pixels as units of an image, said parallel displacement positions being located within a distance of one pixel.

3. The method of reproducing a high-resolution original image according to claim 1 wherein said parallel displacement positions include vertically shifted positions.

4. The method of reproducing a high-resolution original image according to claim 1 wherein said parallel displacement positions include horizontally shifted positions.

5. The method of reproducing a high-resolution original image according to claim 1 wherein said predetermined resolution in said step a) is lower than that of said original image.

6. The method of reproducing a high-resolution original image according to claim 1 wherein said parallel displacement positions are known in said step a).

7. The method of reproducing a high-resolution original image according to claim 1 wherein said step a) further comprises the steps of:

d) obtaining a change in velocity in terms of a speed vector (p,q) based upon the following relation:

$$p\frac{\partial f}{\partial x} + q\frac{\partial f}{\partial y} + \frac{\partial f}{\partial t} = 0$$

e) establishing a relative distance between a predetermined initial position and each of said parallel displacement positions based upon said p and said q; and f) determining the relative positions of said parallel displacement positions with respect to said initial position.

8. The method of reproducing a high-resolution original image according to claim 1 wherein said b) further comprises the steps of:

g) filtering said sampled image data sets with a low pass filter, said low pass filter passing a signal having a frequency range of said original image prior to said sampling;

j) leaving one of said terms representing said original image; and k) reconstructing said original image based upon said terms.

9. The method of reproducing a high-resolution original image according to claim 8 wherein said predetermined number of said image data sets is 2N+1 where N is a number of said fold over alias noises.

10. The method of reproducing a high-resolution original image according to claim 8 wherein said step g) is performed by executing the following multiplication:

$$E_n(u,v) = LPF(u,v)D_n(u,v)$$

where $D_n$ is defined to be $\Sigma \Sigma \exp(-2\pi i(p_n k + q_n l))F(u-k, v-l)$ summing over n as well as k and l, n being a number of said sampled image data sets, k and l being a center of said fold-over aliasing noise, $P_n$ and $q_n$ being a corresponding one of said parallel displacement positions, F(u,v) being a Fourier transfer of a function f(x, y) representing said original image, LPF(u,v) is a function representing said low pass filter, LPF(u,v)=1 if u is equal to or more than a negative value of the predetermined sampled frequency and v is equal to or less than a positive value of the predetermined sampled frequency, otherwise LPF(u,v)=0.

11. The method of reproducing a high-resolution original image according to claim 10 wherein said step h) is accomplished by taking a sum of $w_n E_n(u,v)$ over n where $w_n$ is said corresponding weight value for said n-th sampled image data set.

12. The method of reproducing a high-resolution original image according to claim 11 wherein in said step i), said weight value is adjusted so that a first sum of $w_n$ over n is 1 while simultaneously a second sum of $w_n \exp(2\pi i(p_n k + q_n l))$ is 0.

13. The method of reproducing a high-resolution original image according to claim 12 wherein said weight value is further adjusted so that a third sum of $W_n^2$ is minimal.

14. The method of reproducing a high-resolution original image according to claim 11 wherein in said step i), said weight value is adjusted so that a first sum of $w_n$ over n is 1 while simultaneously a second sum of $\|w_n \exp(2\pi i(p_n k + q_n l))\|^2$ and a third sum $w_n^2$ are minimal.

15. The method of reproducing a high-resolution original image according to claim 1 wherein said step a) further includes the following additional steps of:

l) selecting a high resolution factor;

m) generating additional image data sets based upon said resolution factor and said sampled image data sets; and n) storing said additional image data sets along with said sampled image data sets, said stored additional image data sets and said stored sampled image data sets defining high resolution data sets.

16. The method of reproducing a high-resolution original image according to claim 15 wherein said b) further comprises the steps of:

o) filtering said high resolution data sets with a low pass filter, said low pass filter passing a signal having a frequency range of said original image prior to said sampling;

r) leaving one of said terms involving a function representing said original image; and s) reconstructing said original image at said selected high resolution factor based upon said terms.

17. A system for reproducing a high-resolution original image from a plurality of low-resolution image data sets, comprising:

a sampling unit for sampling an original image at a predetermined sampling resolution for a predetermined number of times so as to compile a predetermined number of the low-resolution image data sets, each of said sampled image data sets representing said original image at parallel displacement positions;

a low pass filter connected to said sampling unit for filtering out a certain portion of said sampled data;

a processing unit connected to said low pass filter for substantially eliminating fold-over aliasing noises caused in said sampled image data sets by said sampling unit, said processing unit further comprising:

a weight determination unit for determining a weight value so as to cancel terms involving a product of each of said fold-over aliasing noises and said weight value; and a summation unit connected to said weight determination unit for summing said terms involving said product of each of said fold-over aliasing noises and said weight value, said fold-over aliasing noises being mutually canceled by placing said weights on said fold-over aliasing noises according to said parallel displacement positions; and a reproduction unit connected to said processing unit for reproducing the original image at least at an original resolution from the low-resolution image data sets.

18. The system for reproducing a high-resolution original image according to claim 17 wherein said sampling unit samples pixels of said original image, said parallel displacement positions being located within a distance of one pixel.

19. The system for reproducing a high-resolution original image according to claim 17 wherein said sampling unit samples said image data sets representing said original image at vertically displacement positions.

20. The system for reproducing a high-resolution original image according to claim 17 wherein said sampling unit samples said image data sets representing said original image at horizontally displacement positions.

21. The system for reproducing a high-resolution original image according to claim 17 wherein said sampling unit samples said image data sets at said predetermined resolution which is lower than that of said original image.

22. The system for reproducing a high-resolution original image according to claim 17 further comprises a displacement positions estimating unit for determining relative positions of said parallel displacement positions with respect to an initial position based upon a change in velocity in terms of a speed as vector (p,q) using a following relation:

$$p\frac{\partial f}{\partial x} + q\frac{\partial f}{\partial y} + \frac{\partial f}{\partial t} = 0$$

said displacement position unit establishing a relative distance between the predetermined initial position and each of said parallel displacement positions based upon said p and said q.

23. The system for reproducing a high-resolution original image according to claim 17 wherein said low pass filter filters said sampled image data sets so as to select a signal having a frequency range of said original image.

24. The system for reproducing a high-resolution original image according to claim 17 wherein said low pass filter designated by LPF(u,v) outputs 1 if u is equal to or more than a negative value of the predetermined sampling resolution and v is equal to or less than a positive value of the predetermined sampling resolution, otherwise LPF(u,v) outputting 0.

25. The system for reproducing a high-resolution original image according to claim 24 wherein said processing unit executes the following multiplication:

$$E_n(u,v) = LPF(u,v)D_n(u,v)$$

where $D_n$ is defined to be $\Sigma \Sigma \exp(-2\pi i(p_n k+q_n l))F(u-k,v-l)$ summing over n as well as k and l, n being a number of said sampled image data sets, k and l being a center of said fold-over aliasing noise, $P_n$ and $q_n$ being a corresponding one of said parallel displacement positions, F(u,v) being a Fourier transfer of a function f(x, y) representing said original image.

26. The system for reproducing a high-resolution original image according to claim 25 wherein said processing unit determines an optimal weight value so as to cancel product terms involving said fold-over aliasing noises with each other, said processing unit sums terms involving a product of each of said fold-over aliasing noises and said weight value.

27. The system for reproducing a high-resolution original image according to claim 26 wherein said processing unit determines said optimal weight value so as to make a first sum over n of $w_n$ 1 while simultaneously a second sum of $w_n \exp(2\pi i(p_n k+q_n l))$ is 0.

28. The system for reproducing a high-resolution original image according to claim 27 wherein said weight value is further adjusted so that a third sum of $w_n^2$ is minimal.

29. The system for reproducing a high-resolution original image according to claim 26 wherein said processing unit determines said weight value so that a first sum of $w_n$ over n is 1 while simultaneously a second sum of $\|\exp(2\pi i(p_n k+q_n l))\|^2$ and a third sum $w_n^2$ are minimal.

30. The system for reproducing a high-resolution original image according to claim 17 wherein said processing unit further comprises:

a resolution selector unit for selecting a high resolution factor;

a resolution increasing unit for generating additional image data sets based upon said resolution factor and said sampled image data sets; and a buffer unit for storing said additional image data sets along with said sampled image data sets, said stored additional image data sets and said stored sampled image data sets defining high resolution data sets.

31. The system for reproducing a high-resolution original image according to claim 30 wherein said processing unit determines an optimal weight value so as to cancel terms involving said fold-over aliasing noises with each other, said processing unit sums said terms involving a product of each of said fold-over aliasing noises and a corresponding weight value for each of said high resolution data sets.

32. The system for reproducing a high-resolution original image according to claim 17 wherein said reproduction unit generates said original image on an image-carrying medium.

33. The system for reproducing a high-resolution original image according to claim 17 wherein said reproduction unit is a display monitor.

* * * * *